US011726912B2

(12) United States Patent
Burger et al.

(10) Patent No.: US 11,726,912 B2
(45) Date of Patent: Aug. 15, 2023

(54) COUPLING WIDE MEMORY INTERFACE TO WIDE WRITE BACK PATHS

(71) Applicant: Microsoft Technology Licensing, LLC, Redmond, WA (US)

(72) Inventors: Douglas C. Burger, Bellevue, WA (US); Aaron L. Smith, Seattle, WA (US); Gagan Gupta, Bellevue, WA (US); David T. Harper, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/216,563

(22) Filed: Mar. 29, 2021

(65) Prior Publication Data
US 2021/0216454 A1    Jul. 15, 2021

Related U.S. Application Data

(62) Division of application No. 15/887,640, filed on Feb. 2, 2018, now Pat. No. 10,963,379.
(Continued)

(51) Int. Cl.
*G06F 9/30* (2018.01)
*G06F 12/0804* (2016.01)
(Continued)

(52) U.S. Cl.
CPC ...... *G06F 12/0804* (2013.01); *G06F 9/30032* (2013.01); *G06F 9/30036* (2013.01);
(Continued)

(58) Field of Classification Search
CPC ............ G06F 12/0844; G06F 9/30032; G06F 9/30036; G06F 9/30043; G06F 9/3824; G06F 9/3828; G06F 9/3885
(Continued)

(56) References Cited

U.S. PATENT DOCUMENTS

| 4,985,832 A | 1/1991 | Grondalski |
| 5,333,320 A | 7/1994 | Seki |

(Continued)

FOREIGN PATENT DOCUMENTS

| EP | 2455854 A1 | 5/2012 |
| JP | 10-336175 | 12/1998 |

(Continued)

OTHER PUBLICATIONS

"Office Action Issued in European Patent Application No. 19701397. 2", dated Nov. 16, 2021, 11 Pages.
(Continued)

*Primary Examiner* — Than Nguyen
(74) *Attorney, Agent, or Firm* — Klarquist Sparkman, LLP

(57) ABSTRACT

Systems and methods are disclosed for performing wide memory operations for a wide data cache line. In some examples of the disclosed technology, a processor having two or more execution lanes includes a data cache coupled to memory, a wide memory load circuit that concurrently loads two or more words from a cache line of the data cache, and a writeback circuit situated to send a respective word of the concurrently-loaded words to a selected execution lane of the processor, either into an operand buffer or bypassing the operand buffer. In some examples, a sharding circuit is provided that allows bitwise, byte-wise, and/or word-wise manipulation of memory operation data. In some examples, wide cache loads allows for concurrent execution of plural execution lanes of the processor.

18 Claims, 24 Drawing Sheets

Related U.S. Application Data

(60) Provisional application No. 62/624,067, filed on Jan. 30, 2018.

(51) Int. Cl.
*G06F 9/38* (2018.01)
*G06F 12/0844* (2016.01)

(52) U.S. Cl.
CPC .......... *G06F 9/30043* (2013.01); *G06F 9/383* (2013.01); *G06F 9/3824* (2013.01); *G06F 9/3828* (2013.01); *G06F 9/3885* (2013.01); *G06F 9/3887* (2013.01); *G06F 12/0844* (2013.01); *G06F 2212/1032* (2013.01)

(58) Field of Classification Search
USPC ........................................................ 711/167
See application file for complete search history.

(56) References Cited

U.S. PATENT DOCUMENTS

| | | |
|---|---|---|
| 5,615,350 A | 3/1997 | Hesson |
| 5,790,822 A | 8/1998 | Sheaffer et al. |
| 5,796,997 A | 8/1998 | Lesartre et al. |
| 5,826,049 A | 10/1998 | Ogata et al. |
| 5,845,103 A | 12/1998 | Sodani et al. |
| 5,928,350 A | 7/1999 | Shu et al. |
| 5,943,501 A | 8/1999 | Burger et al. |
| 6,016,399 A | 1/2000 | Chang |
| 6,061,776 A | 5/2000 | Burger et al. |
| 6,161,170 A | 12/2000 | Burger et al. |
| 6,164,841 A | 12/2000 | Mattson et al. |
| 6,295,599 B1 | 9/2001 | Hansen et al. |
| 6,493,820 B2 | 12/2002 | Akkary et al. |
| 6,529,922 B1 | 3/2003 | Hoge |
| 6,615,340 B1 | 9/2003 | Wilmot |
| 6,625,773 B1 | 9/2003 | Boivie et al. |
| 6,891,828 B2 | 5/2005 | Ngai |
| 6,918,032 B1 | 7/2005 | Abdallah et al. |
| 6,965,969 B2 | 11/2005 | Burger et al. |
| 6,980,209 B1 | 12/2005 | Donham et al. |
| 6,988,183 B1 | 1/2006 | Wong |
| 7,032,217 B2 | 4/2006 | Wu |
| 7,085,913 B2 | 8/2006 | Harding et al. |
| 7,299,458 B2 | 11/2007 | Hammes |
| 7,320,037 B1 | 1/2008 | Maturi et al. |
| 7,380,038 B2 | 5/2008 | Gray |
| 7,599,998 B2 | 10/2009 | Galbraith et al. |
| 7,676,650 B2 | 3/2010 | Ukai |
| 7,853,777 B2 | 12/2010 | Jones et al. |
| 7,877,580 B2 | 1/2011 | Eickemeyer et al. |
| 7,917,733 B2 | 3/2011 | Kazuma |
| 8,055,881 B2 | 11/2011 | Burger et al. |
| 8,055,885 B2 | 11/2011 | Nakashima |
| 8,127,119 B2 | 2/2012 | Burger et al. |
| 8,180,997 B2 | 5/2012 | Burger et al. |
| 8,201,024 B2 | 6/2012 | Burger et al. |
| 8,250,555 B1 | 8/2012 | Lee et al. |
| 8,321,850 B2 | 11/2012 | Bruening et al. |
| 8,433,885 B2 | 4/2013 | Burger et al. |
| 8,447,911 B2 | 5/2013 | Burger et al. |
| 8,464,002 B2 | 6/2013 | Burger et al. |
| 8,812,821 B2 | 8/2014 | Hansen et al. |
| 8,817,793 B2 | 8/2014 | Mushano |
| 9,021,241 B2 | 4/2015 | Burger et al. |
| 9,043,769 B2 | 5/2015 | Vorbach |
| 9,053,292 B2 | 6/2015 | Abdallah |
| 10,963,779 B2 | 3/2021 | Burger et al. |
| 2002/0121555 A1 | 9/2002 | Cipolla et al. |
| 2002/0126661 A1 | 9/2002 | Ngai |
| 2002/0126671 A1 | 9/2002 | Ellis et al. |
| 2003/0088694 A1 | 5/2003 | Patek et al. |
| 2004/0076155 A1 | 4/2004 | Yajnik et al. |
| 2004/0230776 A1 | 11/2004 | Check et al. |
| 2005/0005084 A1 | 1/2005 | Burger et al. |
| 2007/0165547 A1 | 7/2007 | Lindwer et al. |
| 2009/0013132 A1* | 1/2009 | Kurd ................... G06F 12/0886 711/125 |
| 2009/0013135 A1 | 1/2009 | Burger et al. |
| 2009/0013160 A1 | 1/2009 | Burger et al. |
| 2009/0164763 A1 | 6/2009 | Sperber et al. |
| 2009/0201928 A1 | 8/2009 | Chen et al. |
| 2009/0240918 A1* | 9/2009 | Kapadia ................ G06F 9/3824 712/205 |
| 2010/0146209 A1 | 6/2010 | Burger et al. |
| 2010/0325395 A1 | 12/2010 | Burger et al. |
| 2011/0010525 A1 | 1/2011 | Binkert et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2012/0303933 A1 | 11/2012 | Manet et al. |
| 2012/0311306 A1 | 12/2012 | Mushano |
| 2013/0198499 A1 | 8/2013 | Dice et al. |
| 2014/0052918 A1* | 2/2014 | Khailany ............ G06F 12/0859 711/E12.024 |
| 2014/0181475 A1 | 6/2014 | Abdallah |
| 2014/0372736 A1 | 12/2014 | Greenhalgh |
| 2015/0067662 A1 | 3/2015 | Palalau |
| 2015/0100757 A1 | 4/2015 | Burger et al. |
| 2015/0127928 A1 | 5/2015 | Burger et al. |
| 2015/0199199 A1 | 7/2015 | Burger et al. |
| 2015/0220339 A1 | 8/2015 | Khan et al. |
| 2016/0202989 A1 | 7/2016 | Eisen et al. |
| 2016/0306772 A1 | 10/2016 | Burger et al. |
| 2016/0378483 A1 | 12/2016 | Burger et al. |
| 2017/0083335 A1 | 3/2017 | Burger et al. |
| 2017/0083339 A1 | 3/2017 | Burger et al. |
| 2017/0315814 A1 | 11/2017 | Smith et al. |
| 2017/0315815 A1* | 11/2017 | Smith ................... G06F 9/3818 |
| 2020/0310992 A1* | 10/2020 | Cook .................. G06F 12/0815 |

FOREIGN PATENT DOCUMENTS

| | | |
|---|---|---|
| WO | WO 03/017562 | 2/2003 |
| WO | WO 2006/127856 | 11/2006 |
| WO | WO 2014/193878 | 12/2014 |

OTHER PUBLICATIONS

Bouwens et al., "Architecture Enhancements for the ADRES Coarse-Grained Reconfigurable Array," High Performance Embedded Architectures and Compilers, Springer Berlin Heidelberg pp. 66-81 (2008).

Burger et al., "Design and Implementation of the TRIPS EDGE Architecture", In Proceedings of the 32nd Annual International Symposium on Computer Architecture, Jun. 4, 2005, pp. 1-41.

Burger et al., "Scaling to the End of Silicon with EDGE Architectures," In Proceedings of Computer, vol. 37, Issue 7, Jul. 1, 2004, pp. 44-55.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

"Explicit Data Graph Execution", Retrieved on: Aug. 6, 2015, Available at: https://en.wikipedia.org/wiki/Explicit_Data_Graph_Execution.

(56) References Cited

OTHER PUBLICATIONS

Fallin, et al., "The Heterogeneous Block Architecture", In Proceedings of 32nd IEEE International Conference on Computer Design, Oct. 19, 2014, pp. 1-8.

Gebhart et al., "An Evaluation of the TRIPS Computer System," In Proceedings of the 14th international conference on Architectural support for programming languages and operating systems, Mar. 7, 2009, 12 pages.

Govindan, "E3:Energy-Efficient EDGE Architectures", In Dissertation, Aug. 2010, 244 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gray, "GRVI Phalanx: a Massively Parallel RISC-V FPGA Accelerator Accelerator," 24th IEEE Symposium on Field-Programmable Custom Computing Machines (FCCM 2016), May 1, 2016, 4 pages.

Gray and Smith, "Towards an Area-Efficient Implementation of a High ILP Edge Soft Processor: Comparing Out-of-Order Dataflow Instruction Scheduler Designs," poster temporarily on display during the 22nd IEEE International Symposium on Field-Programmable Custom Computing Machines May 11-13, 2014, Boston, Massachusetts (poster on display for approximately 1-2 hours, and less than one day, May 2014).

Gupta, "Design Decisions for Tiled Architecture Memory Systems," document marked Sep. 18, 2009, available at: http://cseweb.ucsd.edU/~a2gupta/uploads/2/2/7/3/22734540/researchexam.paper.pdf, 14 pages.

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).

Huang, "Improving Processor Performance Through Compiler-Assisted Block Reuse," In Doctoral Dissertation, May 2000, 125 pages.

"International Search Report and Written Opinion Issued in PCT Application No. PCT/US19/012010", dated Apr. 25, 2019, 17 Pages.

Ipek et al., "Core Fusion: Accommodating Software Diversity in Chip Multiprocessors", In Proceedings of the 34th annual international symposium on Computer architecture, Jun. 9, 2007, 12 pages.

Jain et al., "DeCO: a DSP Block Based FPGA Accelerator Overlay with Low Overhead Interconnect," 24th IEEE Symposium on Field-Programmable Custom Computing Machines (FCCM 2016), May 1, 2016, 8 pages.

Junktns, "The Compute Architecture of Intel® Processor Graphics Gen9", Published on: Aug. 14, 2015, Available at: https://software.intel.com/sites/default/files/managed/c5/9a/The-Compute-Architecture-of-Intel-Processor-Graphics-Gen9-v1d0.pdf.

Kavi, et al., "Concurrency, Synchronization, Speculation—the Dataflow Way", In Journal of Advances in Computers, vol. 96, Nov. 23, 2013, pp. 1-41.

Keckler et al., "Tera-Op Reliable Intelligently Adaptive Processing System (Trips)," In AFRL-IF-WP-TR-2004-1514, document dated Apr. 2004, 29 Pages.

Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).

Kozumplik, et al., "TRIPS to the Semantic EDGE", Retrieved on: Sep. 22, 2015, Available at: http://vbn.aau.dk/ws/files/61072300/1212050422.pdf.

Leibson et al., "Configurable Processors: a New Era in Chip Design", In Journal of Computer, vol. 38, Issue 7, Jul. 2015, pp. 51-59.

Li et al., "Code Layout Optimization for Defensiveness and Politeness in Shared Cache," 11 pages, (also published as Li, et al., "Code Layout Optimization for Defensiveness and Politeness in Shared Cache" 43rd International Conference on Parallel Processing (ICPP), IEEE, pp. 151-161 (2014)).

Liu, "Hardware Techniques to Improve Cache Efficiency", In Dissertation of the University of Texas at Austin, May 2009, 189 pages.

Maher, "Atomic Block Formation for Explicit Data Graph Execution Architectures", In Dissertation of Doctor of Philosophy, Aug. 2010, 185 pages.

Maher et al., "Merging Head and Tail Duplication for Convergent Hyperblock Formation," In Annual IEEE/ACM International Symposium on Microarchitecture, Dec. 2006, 12 pages.

McDonald et al., "Characterization of TCC on Chip-Multiprocessors," Parallel Architectures and Compilation Techniques, 2005. PACT 2005. 14th International Conference on. IEEE, 2005, 12 pages.

McDonald et al., "TRIPS Processor Reference Manual," In Technical Report TR-05-19, document marked Mar. 10, 2005, 194 pages.

Mei et al., "ADRES: an Architecture with Tightly Coupled VLIW Processor and Coarse-Grained Reconfiguration Matrix," 10 pages, (also published as Mei, et al. "ADRES: an architecture with tightly coupled VLIW processor and coarse-grained reconfigurable matrix," In Proceedings of 13th International Conference on Field-Programmable Logic and Applications, pp. 61-70 (Sep. 2003)).

Melvin et al., "Enhancing Instruction Scheduling with a Block-Structured ISA," International Journal of Parallel Programming, vol. 23, No. 3, Jun. 1995, 23 pages.

Microsoft Research, "E2," document downloaded on Apr. 10, 2015 from http://research.microsoft.com/en-us/projects/e2/.

Munshi, et al., "A Parameterizable SIMD Stream Processor", In Proceedings of Canadian Conference on Electrical and Computer Engineering, May 1, 2005, pp. 806-811.

Nagarajan et al., "Critical Path Analysis of the TRIPS Architecture," In IEEE International Symposium on Performance Analysis of Systems and Software, Mar. 19, 2006, 11 pages.

Nagarajan et al., "A Design Space Evaluation of Grid Processor Architectures," In Proceedings of the 34th annual ACM/IEEE international symposium on Microarchitecture, Dec. 1, 2001, pp. 40-51.

Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.

Park et al., "Polymorphic Pipeline Array: a flexible multicore accelerator with virtualized execution for mobile multimedia applications," 42nd Annual IEEE/ACM International Symposium on Microarchitecture, Dec. 12, 2009, 11 pages.

Pengfei et al., "M5 Based EDGE Architecture Modeling", In Proceedings of IEEE International Conference on Computer Design, Oct. 3, 2010, pp. 289-296.

Pierce et al., "Wrong-Path Instruction Prefetching", In Proceedings of the 29th Annual IEEE/ACM International Symposium on Microarchitecture, Dec. 2, 1996, pp. 1-17.

Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).

Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.

Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.

Roesner, "Counting Dependence Predictors," In Undergraduate Honors Thesis, May 2, 2008, 25 pages.

Sankaralingam et al., "Distributed Microarchitectural Protocols in the TRIPS Prototype Processor," 12 pages (also published as

(56) References Cited

OTHER PUBLICATIONS

"Distributed Microarchitectural Protocols in the TRIPS Prototype Processor," Proceedings of 39th Annual IEEE/ACM International Symposium on Microarchitecture, pp. 480-491 (2006)).
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sankaralingam, "Polymorphous Architectures: a Unified Approach for Extracting Concurrency of Different Granularities", In Doctoral Dissertation of Philosophy, Aug. 2007, 276 pages.
Sankaralingam, et al., "TRIPS: a Polymorphous Architecture for Exploiting ILP, TLP, and DLP", In Journal of ACM Transactions on Architecture and Code Optimization, vol. 1, No. 1, Mar. 2004, pp. 62-93.
Sethumadhavan et al., "Design and Implementation of the TRIPS Primary Memory System," In Proceedings of International Conference on Computer Design, Oct. 1, 2006, 7 pages.
Sibi et al., "Scaling Power and Performance via Processor Composability," University of Texas at Austin technical report No. TR-10-14 (2010), 20 pages.
Smith et al., "Compiling for EDGE Architectures," In Proceedings of International Symposium on Code Generation and Optimization, Mar. 26, 2006, 11 pages.
Smith et al., "Dataflow Predication", In Proceedings of 39th Annual IEEE/ACM International Symposium on Microarchitecture, Dec. 9, 2006, 12 pages.
Smith, "Explicit Data Graph Compilation," In Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Souza et al., "Dynamically Scheduling VLIW Instructions", In Journal of Parallel and Distributed Computing, vol. 60, Jul. 2000, pp. 1480-1511.
Tamches et al., "Dynamic Kernel Code Optimization," In Workshop on Binary Translation, 2001, 10 pages.
Taylor et al., "Scalar Operand Networks: on-chip Interconnectg for ILP in Partitioned Architectures," Proceedings of the 9th International Symposium on High-Performance Computer Architecture, Feb. 2003, pp. 341-353.
Tutsch et al., "MLMIN: a Multicore Processor and Parallel Computer Network Topology for Multicast," vol. 35, Issue 12, Dec. 2008, pp. 3807-3821.
Voicu et al., "3D Stacked Wide-Operand Adders: a Case Study", In Proceedings of the 24th International Conference on Application-specific Systems, Architectures and Processors, Jun. 5, 2013, 9 pages.
Wang et al., "Power-driven Design of Router Microarchitectures in on-chip Networks," Proceedings of the 36th Annual IEEE/ACM International Symposium on Microarchitecture, Feb. 2003, pp. 105-116.
Wikipedia, "Network on Chip," retrieved from http://en.widipedia/wiki/Network_On_Chip, Sep. 15, 2009, 4 pages.
Wong et al., "High Performance Instruction Scheduling Circuits for Out-of-Order Soft Processors," 24th IEEE Symposium on Field-Programmable Custom Computing Machines (FCCM 2016), May 1, 2016, 8 pages.
Wu et al., "Block Based Fetch Engine for Superscalar Processors", In Proceedings of the 15th International Conference on Computer Applications in Industry and Engineering, Nov. 7, 2002, 4 pages.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
"Notice of Allowance Issued in European Patent Application No. 19701397.2", dated Nov. 7, 2022, 8 Pages.
"Notice of Allowance Issued in European Patent Application No. 19701397.2", dated Feb. 22, 2023, 8 Pages.
"Notice of Allowance European Issued in Patent Application No. 19701397.2", dated May 19, 2023, 2 Pages.

* cited by examiner

FIG. 5
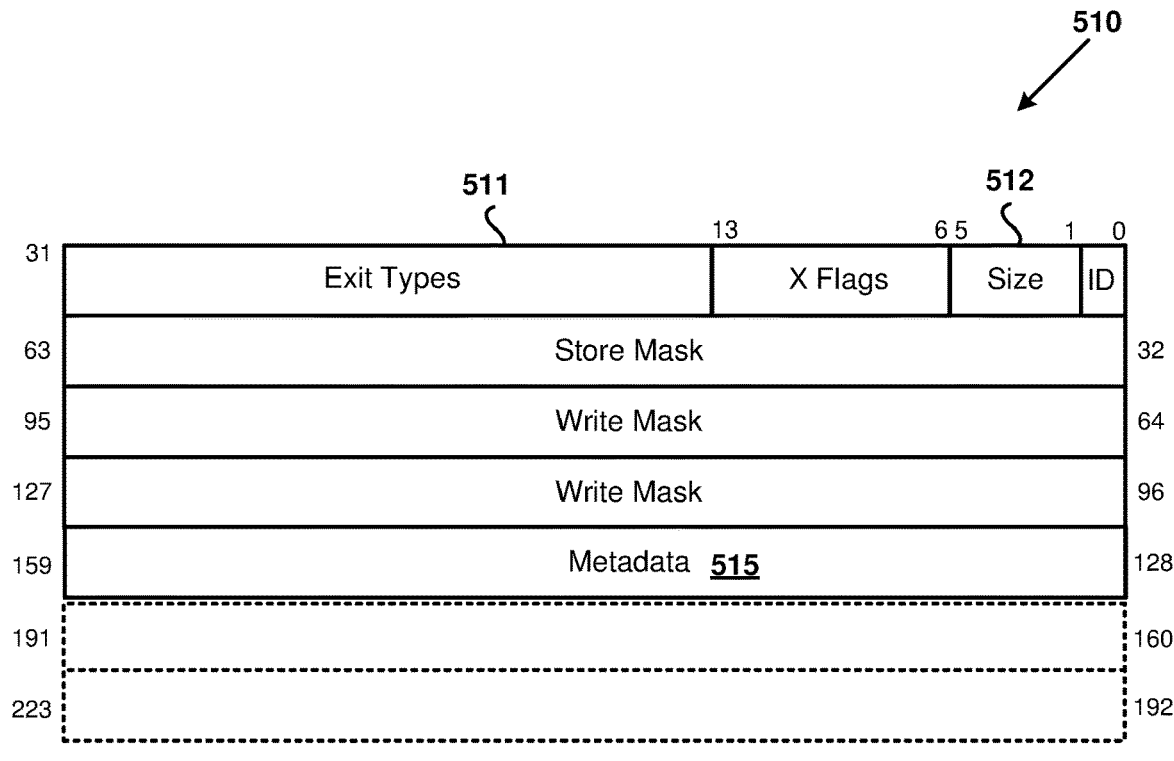
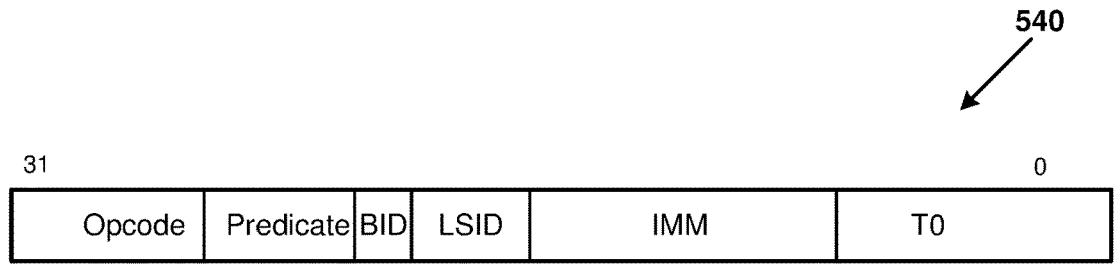

```
void matrix_mul_vect(int N, double *C, double *A, double *B) {
   int i, j;
   for (i=0; i<N; i++) {
      C[i]=0;
      for (j=0; j<N; j++) {
         C[i] += A[i*N+j] * B[j];
      }
   }
}
```

```
LOOP3:    READ     T3, R21           // Load A address
          READ     T2, R22           // Load B address
          READ     T5, R19           // Load C
          READ     T1, R20           // Loop index
          LD       T6, 0[R21]        // Load A[]
          LD       T7, 0[R22]        // Load B[]

MUL      T8, T7, T6        // A*B
          ADD      T9, T5, T8        // C+A*B

ADDI     T22, T3, #        // Incr A address
          ADDI     T23, T2, #        // Incr B address
          ADDI     T24, T1, 1        // Incr loop index
          READ     T0, R13           // Check end of loop TNE.BF   T25, T0, T24, LOOP3    // Branch as needed
          WRITE    R19, T9           // Save temp C
          WRITE    R21, T22          // Save A address
          WRITE    R22, T23          // Save B address
          WRITE    R20, T24          // Save C loop counter LOOP2p:                              // Store C
                                     // Setup next iter of LOOP2
```

```
void matrix_mul_vect(int N, double *C, double *A, double *B) {
   int i,j;
   for (i=0; i<N; i++) {
      C[i]=0;
      for (j=0; j<N; j+=8) {
         for (k = 0; k<7; k++) {
            C'[i] += A[k*N+j] * B[j];
         }
      }
      for (k = 0; K<N/8; k+=8) {
         // Reduce C[i]
      }
   }
}
```

FIG. 17B

```
LOOP3:    READ    T3, R21             // Load A address
          READ    T2, R22             // Load B address
          READ    T5, R19             // Load C address
          READ    T1, R20             // Loop index
          LD      T6, 0[R21]          // Load A[]
          LD      T7, 0[R22]          // Load B[]

MUL     T8, T7, T6          // A*B
          ADD     T9, T5, T8          // C+A*B

ADDI    T22, T3, #          // Incr A address
          ADDI    T23, T2, #          // Incr B address
          ADDI    T25, T5, #          // Incr C address
          ADDI    T24, T1, 1          // Incr loop index
          READ    T0, R13             // Check end of loop TNE.BF  T25, T0, T24, LOOP3 // Branch as needed
          ST      T9, [T5]            // Save temp C
          WRITE   R21, T22            // Save A address
          WRITE   R22, T23            // Save B address
          WRITE   R19, T25            // Save C address
          WRITE   R20, T24            // Save C loop counter LOOP2p:                               // Store C
                                      // Setup next iter of
                                      // LOOP2
```

LOOP3:    READ      T3, R21         // Load A address
          READ      T2, R22         // Load B address
          READ      T5, R19         // Load C address
          READ      T1, R20         // Loop index
          LD        T6, 0[R21]      // Load A[]
          LD        T7, 0[R22]      // Load B[]

MUL.16    T8, T7, T6      // A*B
          RED.16    T9, T5, T8      // C+A*B

ADDI      T22, 13, #      // Incr A address
          ADDI      T23, 12, #      // Incr B address
          ADDI      T25, T5, 1      // Incr C address
          ADDI      T24, T1, 1      // Incr loop index
          READ      T0, R13         // Check end of loop TNE.BF    T25, T0, T24, LOOP3    // Branch as needed
          ST        T9              // Save temp C
          WRITE     R21, T22        // Save A address
          WRITE     R22, T23        // Save B address
          WRITE     R19, T25        // Save C address
          WRITE     R20, T24        // Save C loop counter LOOP2p:                             // Reduce C
                                    // Setup next iter of LOOP2
```

FIG. 18A

| Cycle | Block 1 | Block 2 | Block 3 | Block 4 | DNN Comps | Loop Comps |
|---|---|---|---|---|---|---|
| 1 | Read Addresses, increments | | | | | |
| 2 | LD A | | | | | |
| 3 | LD B | Read Addresses, increments | | | | |
| 4 | MUL.MSFP | LD A | | | | |
| 5 | RED.MSFP | LD B | Read Addresses, increments | | | |
| 6 | ST C, Writebacks | MUL.MSFP | LD A | | | |
| 7 | Read Addresses, increments | RED.MSFP | LD B | Read Addresses, increments | | |
| 8 | LD A | ST C, Writebacks | MUL.MSFP | LD A | 8*15 | 4 |
| 9 | LD B | Read Addresses, increments | RED.MSFP | LD B | 8*16 | |
| 10 | MUL.MSFP | LD A | ST C, Writebacks | MUL.MSFP | 8*15 | |
| 11 | RED.MSFP | LD B | Read Addresses, increments | RED.MSFP | 8*16 | |
| 12 | ST C, Writebacks | MUL.MSFP | LD A | ST C, Writebacks | 8*15 | 4 |
| 13 | Read Addresses, increments | RED.MSFP | LD B | Read Addresses, increments | 8*16 | |
| 14 | LD A | ST C, Writebacks | MUL.MSFP | LD A | 8*15 | |
| 15 | LD B | Read Addresses, increments | RED.MSFP | LD B | 8*16 | 4 |
| 16 | MUL.MSFP | LD A | ST C, Writebacks | MUL.MSFP | 8*15 | |
| 17 | RED.MSFP | LD B | Read Addresses, increments | RED.MSFP | 8*16 | |
| 18 | ST C, Writebacks | MUL.MSFP | LD A | ST C, Writebacks | 8*15 | 4 |
| 19 | Read Addresses, increments | RED.MSFP | LD B | Read Addresses, increments | 8*16 | |
| 20 | LD A | ST C, Writebacks | MUL.MSFP | LD A | 8*15 | |

| Cycle | Block 1 | Block 2 | Block 3 | Block 4 | DNN Comps | Loop Comps |
|---|---|---|---|---|---|---|
| 1 | Read Addresses, increments | Read Addresses, increments | Read Addresses, increments | Read Addresses, increments | | 16 |
| 2 | LD A | LD A | LD A | LD A | | |
| 3 | LD B | LD B | LD B | LD B | | |
| 4 | MUL.MSFP | MUL.MSFP | MUL.MSFP | MUL.MSFP | 4*8*16 | |
| 5 | RED.MSFP | RED.MSFP | RED.MSFP | RED.MSFP | 4*8*15 | |
| 6 | ST C, Writebacks | ST C, Writebacks | ST C, Writebacks | ST C, Writebacks | | |
| 7 | Read Addresses, increments | Read Addresses, increments | Read Addresses, increments | Read Addresses, increments | | 16 |
| 8 | LD A | LD A | LD A | LD A | | |
| 9 | LD B | LD B | LD B | LD B | | |
| 10 | MUL.MSFP | MUL.MSFP | MUL.MSFP | MUL.MSFP | 4*8*16 | |
| 11 | RED.MSFP | RED.MSFP | RED.MSFP | RED.MSFP | 4*8*15 | |
| 12 | ST C, Writebacks | ST C, Writebacks | ST C, Writebacks | ST C, Writebacks | | |
| 13 | | | | | | |
| 14 | | | | | | |

1820

1830 ns# COUPLING WIDE MEMORY INTERFACE TO WIDE WRITE BACK PATHS

CROSS-REFERENCE TO RELATED APPLICATION

This application is a divisional of U.S. patent application Ser. No. 15/887,640, filed Feb. 2, 2018 (now U.S. Pat. No. 10,963,779), which claims the benefit of U.S. Provisional Application No. 62/624,067, filed Jan. 30, 2018, which applications are incorporated by reference in their entirety.

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for processors, including those having a general purpose instruction set architecture (ISA), such as RISC or Complex Instruction Set Computing (CISC) ISAs, block-based processor instruction set architecture (BB-ISA), or other ISAs. These microarchitectures can be configured to execute instructions using a variable number of allocated resources.

The described techniques and tools can potentially improve processor performance and can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, touch screen tablet devices, tablet computers, wearable computers, and laptop computers. The disclosed techniques can be used in general-purpose Reduced Instruction Set Computing (RISC) or Complex Instruction Set Computing (CISC) processors, block based processors such as Explicit Data Graph Execution (EDGE) processors, digital signal processors, or other suitable types of processors.

In some examples of the disclosed technology, an apparatus comprising a processor having two or more execution lanes includes a data cache coupled to memory, a wide memory load circuit that concurrently loads two or more words from a cache line of the data cache, and a write back path situated to send the respective selected word of the concurrently loaded words from the cache line to a respective selected execution lane of the processor. In some examples, the apparatus can be configured to perform methods of rearranging words, bytes, and/or bits of the loaded data and/or storage data using a sharding circuit. In some examples, at least some of the operations performed with the execution lanes includes SIMD operations on portions of a word or byte.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 5 illustrates block-based processor headers and instructions, as can be used in some examples of the disclosed technology.

FIGS. 16A and 16B depict source and assembly code for a matrix vector multiplication inner loop, as can be used in certain examples of the disclosed technology.

FIGS. 17A-17C depict source and assembly code for a re-factored matrix vector multiplication inner loop, as can be used in certain examples of the disclosed technology.

FIGS. 18A and 18B illustrate scheduled operations to perform a matrix vector multiplication inner loop, as can be used in certain examples of the disclosed technology.

DETAILED DESCRIPTION

I. General Considerations

Figure 1:
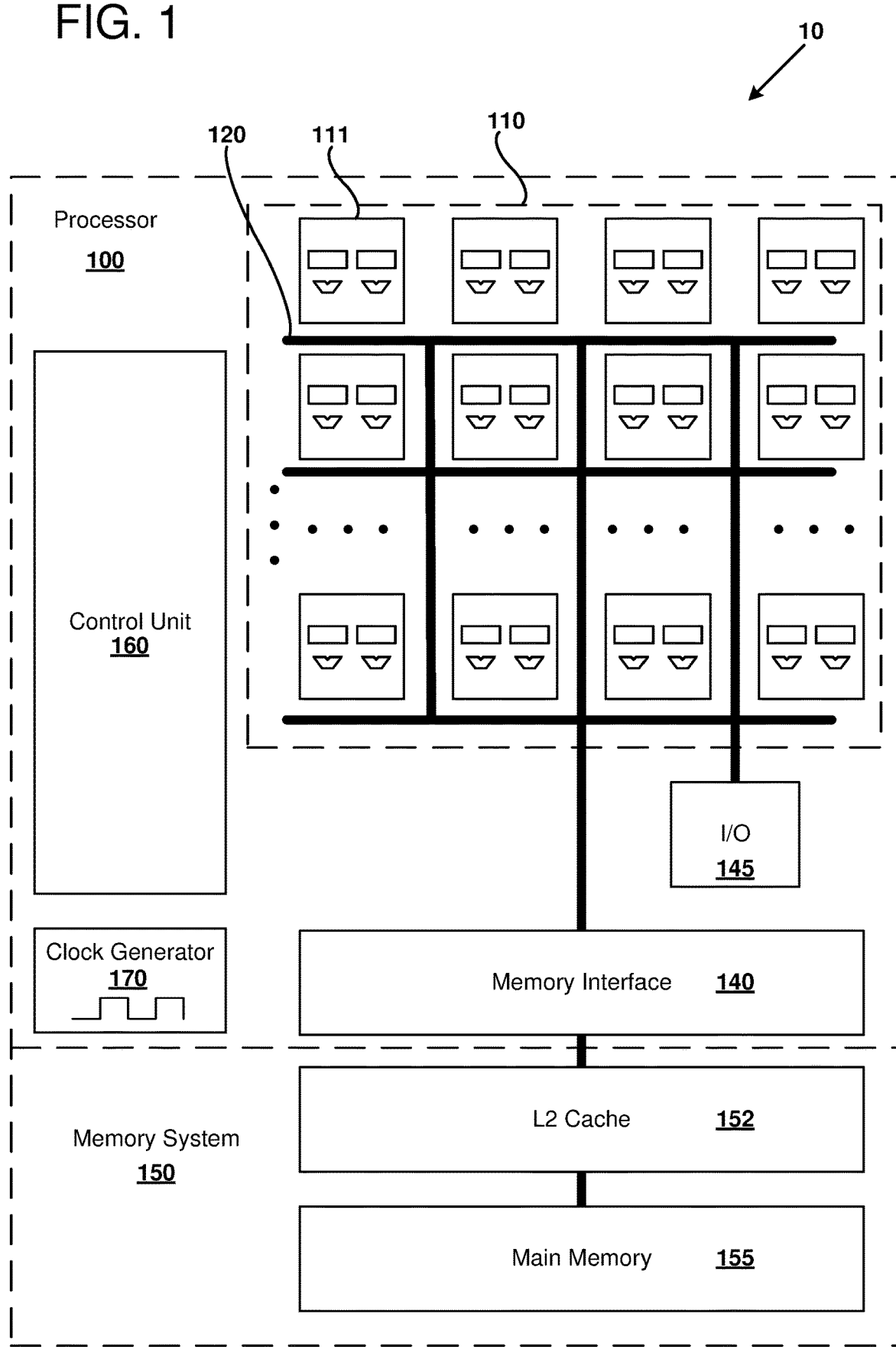
FIG. 1 illustrates a block-based processor including multiple processor cores, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

As used herein, "bit" means a basic unit of data for a processor. A bit is typically either a zero (0) or one (1), but in certain architectures, ternary or other non-binary bits can be employed. As used herein, the term "word" refers to a unit of two or more bits of data that is the size of an instruction operand. Words are typically 16, 32, 64, or 128 bits, although other sizes of words, including 48, 80, or 256 bits can be used. In certain applications, smaller words (e.g., 4-bit, 6-bit, or 8-bit) words may be used, including some neural network or low-precision applications. As used herein, "bytes" are typically 7 or 8 bits.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block-based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive energy-consuming circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques. Further, implementations of certain high memory bandwidth operations, such as neural networks, is typically inefficient using general purpose architectures.

The disclosed technologies can realize energy efficiency and/or performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor comprising multiple processor cores uses an Explicit Data Graph Execution (EDGE) ISA designed for area- and energy-efficient, high-ILP execution. In some examples, a general purpose instruction set architecture (ISA), such as RISC or Complex Instruction Set Computing (CISC) ISA processor is adapted to use the wide memory load circuits, writeback circuits, and/or sharding circuit disclosed herein. In some examples, use of EDGE architectures and associated compilers finesses away much of the register renaming, CAMs, and complexity. In some examples, the respective cores of the block-based processor can store or cache fetched and decoded instructions that may be repeatedly executed, and the fetched and decoded instructions can be reused to potentially achieve reduced power and/or increased performance.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some block-based examples of the disclosed technology, instructions organized within instruction blocks are fetched, executed, and committed atomically. Within an instruction block, instructions directly communicate results to consuming instructions through operand buffers. Across blocks, results are communicated through named registers. Intermediate results produced by the instructions within an atomic instruction block that affect the architectural state are buffered locally until the instruction block is committed. When the instruction block is committed, updates to the visible architectural state resulting from executing the instructions of the instruction block are made visible to other instruction blocks. Instructions inside blocks execute in dataflow order, which reduces or eliminates using register renaming and provides power-efficient OoO execution. In current process technologies, a typical BB-ISA design may support up to 128-instruction blocks. The block size can influence processor performance, but in general, larger blocks up to a certain size (e.g., 128- or 256-word blocks) are preferred using current process technologies. A program's characteristics, among other factors, can influence the optimum instruction block size.

A compiler can be used to explicitly encode data dependencies through the ISA, reducing or eliminating burdening processor core control logic from rediscovering dependencies at runtime. This includes detection of opportunities to perform wide, multi-word or multi-byte load and store memory operations. In examples using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using visible architectural state such as memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

In some examples, memory can be loaded or stored speculatively. For example, a memory load/store queue can be used to route memory access performed by instructions, thereby minimizing delays in fetching and storing data in memory. In some examples, instruction-level parallelism can be exploited to execute multiple instructions within a block in parallel. In some examples of the disclosed technology, a BB-ISA exposes details of instruction block size and load-store queue size to the programmer, allowing for improved optimization (by a manual programmer or by a compiler).

As will be readily understood to one of ordinary skill in the relevant art, a spectrum of implementations of the disclosed technology are possible with various area, performance, and power tradeoffs.

III. Example Processor

FIG. 1 is a block diagram 10 of a multi-core processor 100 as can be implemented in some examples of the disclosed technology. The processor 100 is configured to execute blocks of instructions according to an instruction set architecture (ISA), which describes a number of aspects of processor operation, including a register model, a number of defined operations performed by instructions, a memory model, interrupts, and other architectural features. The processor includes a plurality of processing cores 110, including a processor core 111. The processor 100 can implement an EDGE ISA, a RISC ISA, a CISC ISA, a DSP ISA, and/or any other suitable instruction set.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1 an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface 140 can include a memory management unit (MMU) for managing and allocating virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface 145 is implemented using memory-mapped I/O techniques in conjunction with the memory interface 140.

The processor 100 can also include a control unit 160. The control unit can communicate with the processing cores 110, the I/O interface 145, and the memory interface 140 via the core interconnect 120 or a side-band interconnect (not shown). The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location (s) of branch instructions, instruction headers, and other changes in control flow. The control unit 160 can also process hardware interrupts, and control reading and writing of special system registers, for example the program counter (or an instruction block address register) stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler that is used to allocate instruction blocks to the processor cores 110. As used herein, scheduler allocation refers to hardware for directing operation of instruction blocks, including initiating instruction block mapping, fetching, decoding, execution, committing, aborting, idling, and refreshing an instruction block. In some examples, the hardware receives signals generated using computer-executable instructions to direct operation of the instruction scheduler. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The control unit 160 can further be used to allocated functional resources within the processor cores to contexts. For example, instruction cache, instruction windows, functional units, register files, branch predictors (next block predictors), and/or data cache can be allocated by the control unit 160.

The processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allow power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Processor Core

Figure 2:
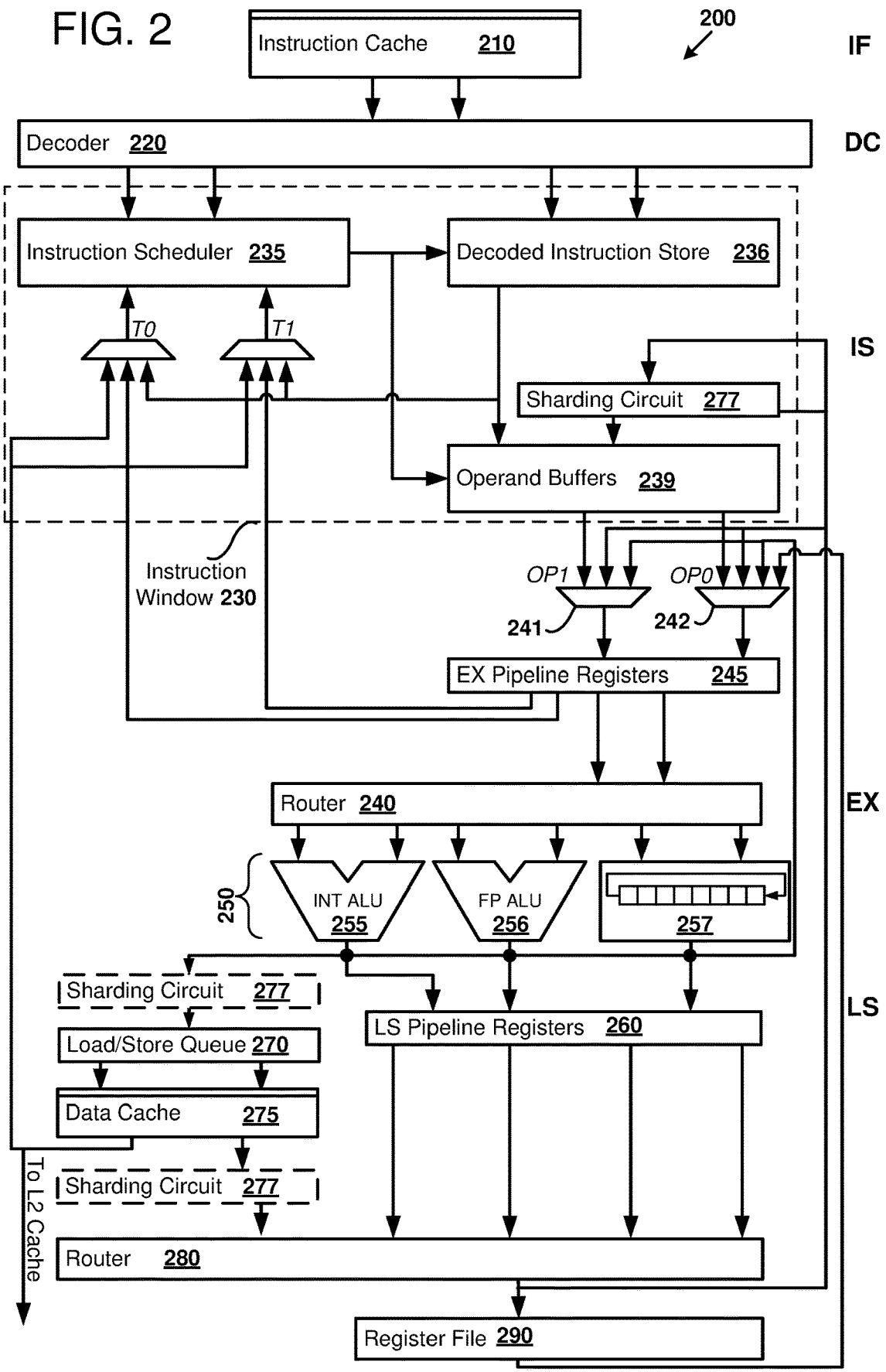
FIG. 2 illustrates a block-based processor core, as can be used in some examples of the disclosed technology.

FIG. 2 is a block diagram further detailing an example microarchitecture 200 for implementing the processor 100, and in particular, an instance of one of the processor cores, as can be used in certain examples of the disclosed technology. The core can execute a general purpose instruction set architecture (ISA), such as RISC or Complex Instruction Set Computing (CISC) ISAs, block-based processor instruction set architecture (BB-ISA), a digital signal processor (DSP), or other suitable ISA. For ease of explanation, the exemplary microarchitecture has five pipeline stages including: instruction fetch (IF), decode (DC), issue, including operand fetch (IS), execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core includes an instruction cache 210 that is coupled to an instruction decoder 220. The instruction cache 210 is configured to receive processor instructions from a memory. In some FPGA implementations, the instruction cache can be implemented by a dual read port, dual write port, 18 or 36 Kb (kilobit), 32 bit wide block RAM. In some examples, the physical block RAM is configured to operate as two or more smaller block RAMs.

The processor core further includes an instruction window 230, which includes an instruction scheduler 235, a decoded instruction store 236, and a plurality of operand buffers 239. In FPGA implementations, each of these instruction window components 230 can be implemented including the use of LUT RAM (e.g., with SRAM configured as lookup tables) or BRAM (block RAM).

In block-based examples, the instruction scheduler 235 can send an instruction identifier (instruction ID or IID) for an instruction to the decoded instruction store 236 and the operand buffers 239 as a control signal. As discussed further below, each instruction in an instruction block has an associated instruction identifier that uniquely identifies the instruction within the instruction block. In some examples, instruction targets for sending the result of executing an instruction are encoded in the instruction. In this way, dependencies between instructions can be tracked using the instruction identifier instead of monitoring register dependencies, as typically used in RISC and CISC general-purpose processors. In some examples, the processor core can include two or more instruction windows. In some examples, the processor core can include one instruction window with multiple block contexts.

As will be discussed further below, the microarchitecture 200 includes a register file 290 that stores data for registers defined in the processor architecture, and can have one or more read ports and one or more write ports. In block-based processor examples, because an instruction block executes on a transactional basis, changes to register values made by an instance of an instruction block are not visible to the same instance; the register writes will be committed upon completing execution of the instruction block.

The decoded instruction store 236 stores decoded signals for controlling operation of hardware components in the processor pipeline. For example, a 32-bit instruction may be decoded into 128-bits of decoded instruction data. The decoded instruction data is generated by the decoder 220 after an instruction is fetched. The operand buffers 239 store operands (e.g., register values received from the register file, data received from memory, immediate operands coded within an instruction, operands calculated by an earlier-issued instruction, or other operand values) until their respective decoded instructions are ready to execute. Instruction operands and predicates for the execute phase of the pipeline are read from the operand buffers 239, respectively, not (directly, at least) from the register file 290. The instruction window 230 can include a buffer for predicates directed to an instruction, including wired-OR logic for combining predicates sent to an instruction by multiple instructions.

In some examples, all of the instruction operands, except for register read operations, are read from the operand buffers 239 instead of the register file. In some examples the values are maintained until the instruction issues and the operand is communicated to the execution pipeline. In some FPGA examples, the decoded instruction store 236 and operand buffers 239 are implemented with a plurality of LUT RAMs.

The instruction scheduler 235 maintains a record of ready state of each decoded instruction's dependencies (e.g., the instruction's predicate and data operands). When all of the instruction's dependencies (if any) are satisfied, the instruction wakes up and is ready to issue. Attributes of the instruction window 230 and instruction scheduler 235, such as area, clock period, and capabilities can have significant impact to the realized performance of an EDGE core and the throughput of an EDGE multiprocessor. In some examples, the front end (IF, DC) portions of the microarchitecture can run decoupled from the back end portions of the microarchitecture (IS, EX, LS). In some FPGA implementations, the instruction window 230 is configured to fetch and decode two instructions per clock into the instruction window.

Control circuits (e.g., signals generated using the decoded instruction store 236) in the instruction window 230 are used to generate control signals to regulate core operation (including, e.g., control of datapath and multiplexer select signals) and to schedule the flow of instructions within the core. This can include generating and using memory access instruction encodings, allocation and de-allocation of cores for performing instruction processing, control of input data and output data between any of the cores 110, register files, the memory interface 140, and/or the I/O interface 145.

In some examples, the instruction scheduler 235 is implemented as a finite state machine coupled to other instruction window logic. In some examples, the instruction scheduler is mapped to one or more banks of RAM in an FPGA, and can be implemented with block RAM, LUT RAM, or other reconfigurable RAM. As will be readily apparent to one of ordinary skill in the relevant art, other circuit structures, implemented in an integrated circuit, programmable logic, or other suitable logic can be used to implement hardware for the instruction scheduler 235. In some examples of the disclosed technology, front-end pipeline stages IF and DC can run decoupled from the back-end pipelines stages (IS, EX, LS).

In the example of FIG. 2, the operand buffers 239 send the data operands to a set of execution state pipeline registers 245 via one or more switches (e.g., multiplexers 241 and 242). In block-based examples, these be designated left operand (LOP) and right operand (ROP) or also be referred to as OP1 and OP0, respectively. A first router 240 is used to send data from the operand buffers 239 to one or more of the functional units 250, which can include but are not limited to, integer ALUs (arithmetic logic units) (e.g., integer ALUs 255), floating point units (e.g., floating point ALU 256), shift/rotate logic (e.g., barrel shifter 257), or other suitable execution units, which can including graphics functions, physics functions, and other mathematical operations. In some examples, an additional programmable execution unit (not shown) can be reconfigured to implement a number of different arbitrary functions (e.g., a priori or at runtime).

Data from the functional units 250 can then be routed through a second router (not shown) to a set of load/store pipeline registers 260, to a load/store queue 270 (e.g., for performing memory load and memory store operations), or fed back to the execution pipeline registers, thereby bypassing the operand buffers 239. The load/store queue 270 is coupled to a data cache 275 that caches data for memory operations, including wide data cache line loads and stores.

The outputs of the data cache 275 and the load/store pipelines registers 260 can be sent to a third router 280, which in turn sends data to the register file 290, the operand buffers 239, and/or the execution pipeline registers 245, according to the instruction being executed in the pipeline stage.

A sharding circuit 277 can be used to perform bitwise, byte-wise, or multi-byte-wise data manipulations, as will be further discussed below. Some implementations use an arrangement as shown in FIG. 2. However, in other examples, the sharding circuit 277 can be placed in other arrangements, such as the two arrangements indicated by dashed lines in FIG. 2.

In block-based processor implementations, when execution of an instruction block is complete, the instruction block is designated as "committed" and signals from the control outputs can in turn can be used by other cores within the block-based processor 100 and/or by the control unit 160 to initiate scheduling, fetching, and execution of other instruction blocks.

As will be readily understood to one of ordinary skill in the relevant art, the components within an individual core are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

As will be readily apparent to one of ordinary skill in the relevant art having the benefit of the present disclosure, trade-offs can be made in processor performance by the design and allocation of resources within the instruction window and control unit of the processor cores 110. The area, clock period, capabilities, and limitations substantially determine the realized performance of the individual cores 110 and the throughput of the block-based processor 100.

In block-based processor implementations, changes to the visible architectural state of the processor (such as to the register file 290 and the memory) affected by the executed instructions can be buffered locally within the core until the instructions are committed. The control circuitry can determine when instructions are ready to be committed, sequence the commit logic, and issue a commit signal. For example, a commit phase for an instruction block can begin when all register writes are buffered, all writes to memory (including unconditional and conditional stores) are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control circuit also controls, at least in part, allocation of functional units to the instructions window.

Because the instruction block is committed (or aborted) in block-based processor implementations as an atomic transactional unit, it should be noted that results of certain operations are not available to instructions within an instruction block. This is in contrast to RISC and CISC architectures that provide results visible on an individual, instruction-by-instruction basis. Thus, additional techniques are disclosed for supporting memory synchronization and other memory operations in a block-based processor environment.

In some examples, non-control flow instructions (e.g., instructions that are not branch or jump instructions, which can update a program counter) can be non-predicated, or predicated true or false. A predicated instruction does not become ready until it is targeted by another instruction's predicate result, and that result matches the predicate condition. If the instruction's predicate does not match, then the instruction never issues.

In some examples, upon branching to a new instruction block, all instruction window ready state (stored in the instruction scheduler 235) is flash cleared (block reset). However when a block branches back to itself (block refresh), only active ready state is cleared; the decoded ready state is preserved so that it is not necessary to re-fetch and decode the blocks instructions. Thus, refresh can be used to save time and energy in loops, instead of performing a block reset. It can be especially advantageous in certain wide memory load applications to avoid re-fetching instructions for a large number of instruction windows. In some examples, instruction lanes execute lock-step with a leader instruction window, further improving efficiency.

A number of different technologies can be used to implement the instruction scheduler 235. For example, the scheduler 235 can be implemented as a parallel scheduler, where instructions' ready state is explicitly represented in FPGA D-type flip-flops (FFs), and in which the ready status of every instruction is reevaluated each cycle. In other examples, the instruction scheduler 235 can be implemented as a more compact incremental scheduler that keeps ready state in LUT RAM and which updates ready status of about two to four target instructions per cycle.

The register file 290 may include two or more write ports for storing data in the register file, as well as having a plurality of read ports for reading data from individual registers within the register file. In some examples, a single instruction window (e.g., instruction window 230) can access only one port of the register file at a time, while in other examples, the instruction window 230 can access one read port and one write port, or can access two or more read ports and/or write ports simultaneously. In some examples, the microarchitecture is configured such that not all the read ports of the register 290 can use the bypass mechanism.

In some examples, the register file 290 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 290 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, the register file 290 is implemented as an array of flip-flops, while in other examples, the register file can be implemented using latches, SRAM, or other forms of memory storage. The ISA specification for a given processor specifies how registers within the register file 290 are defined and used.

In block-based processor examples, the registers store architectural state, which can be passed to and from different instruction blocks. The architectural state registers are defined by the processor's instruction set architecture.

Because the register file is architecturally visible to the programmer, each concurrently executing context (e.g., a thread or process) is allocated its own register file, or its own portion of the architectural register file. In some examples, this can be implemented by providing a separate register file for each context, or by using a single register file large enough to accommodate every active context, but having appropriate partitions. Any suitable storage technology can be used to implement the architectural register file, including the use of storage elements formed from flip-flops and latches, static RAM (SRAM), or other suitable memory technology. The register file 290 can be formed from a portion or all of a physical register file, which is an array of registers formed from storage elements, that is not necessarily restricted to the processor ISA. For example, physical register files can be partitioned to form multiple architectural register files, each of which is associated with a particular context. In some examples, the physical register may be configured to store renamed register values, or to store register values for a speculatively executed thread or process. Physical register files can be formed from similar storage elements, including flip-flops and latches, static RAM (SRAM), or other suitable memory technology. Such register files can also have multiple input ports and/or multiple read ports in certain implementations.

V. Example Stream of Block-Based Instruction Blocks

Figure 3:
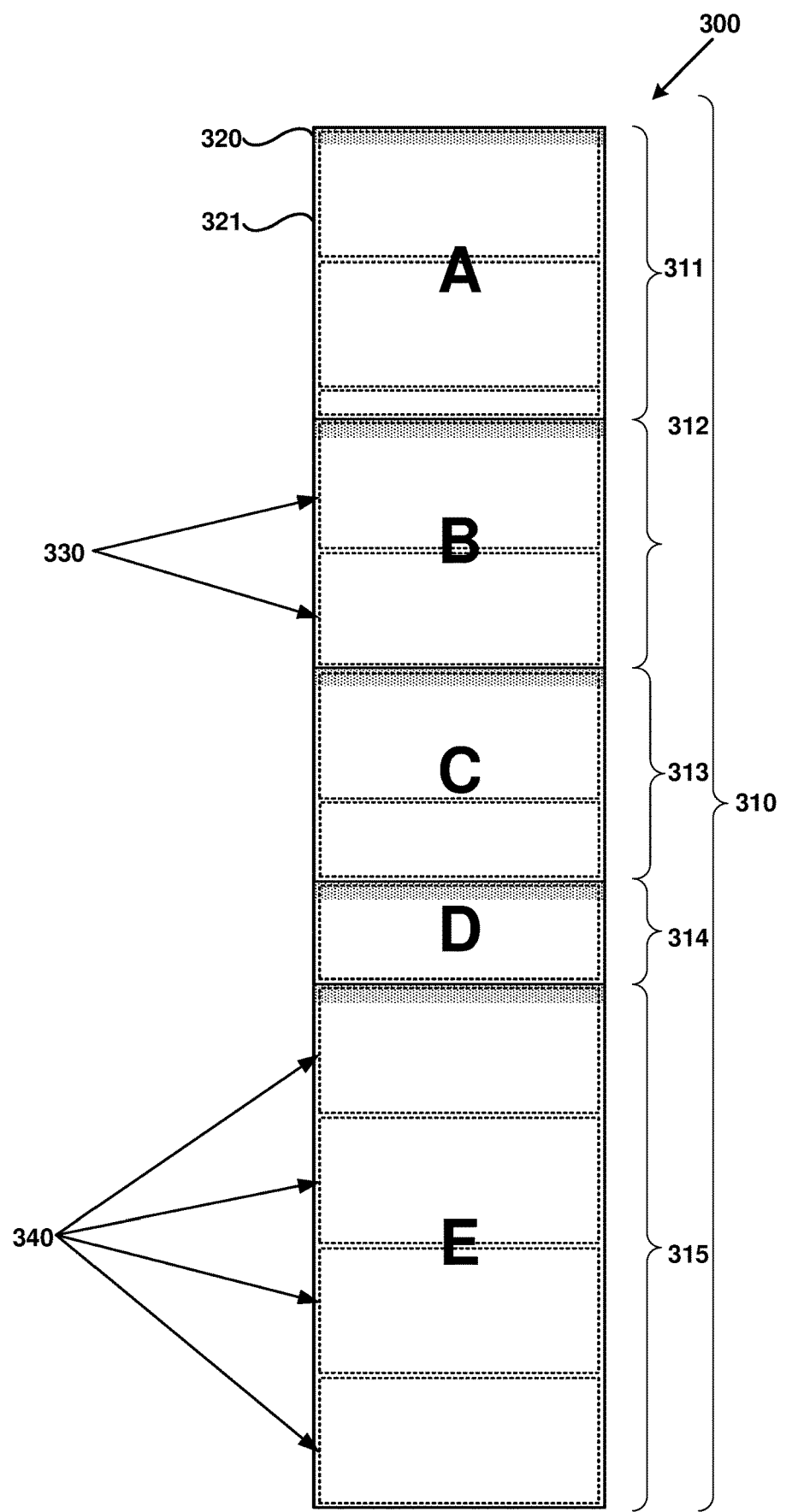
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-315 (A-E) is illustrated. The stream of instructions can be used to implement user application, system services, or any other suitable use. In the example shown in FIG. 3, each instruction block begins with an instruction header, which is followed by a varying number of instructions. For example, the "A" instruction block 311 includes a four-word header 320 and seventy instructions 321. In some examples, an instruction block is divided or "folded" to fit into resources that have been allocated for executing the instruction block. For example, a block-based processor according to the disclosed technology may include instruction windows configured to track state and execute instructions in 32-word chunks. Thus, the A instruction block 311 can be divided into three portions. These portions may be allocated to three segments (or "execution lanes"), or results from the first instruction block portion can be temporarily stored in a results buffer before passing to the subsequent, second portion of the instruction block. Similarly, the "B" instruction block 312 is a 64-word instruction block that can be divided into two, 32-word portions 330, and the "E" instruction block 315 is a 128-word instruction block that can be divided into four, 32-word portions 340. As will be readily understood to one of ordinary skill in the art having the benefit of the present disclosure, instruction blocks may be divided into different size portions, depending on resources in a particular implementation. Further, compilers adapted to generate machine instructions for disclosed processors can arrange instructions within an instruction block to improve processor performance, by, for example, allocating instructions to fall within certain portions of an instruction block. In other configurations, processor resources can be combined such that the instruction block (e.g., instruction block 311 or 315) is fetched and executed as a single instruction block. In some examples, a processor according to the disclosed technologies can be re-configured to operate in two or more different such modes.

The particular, exemplary instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 (zero) indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include execution flags, which indicate special instruction execution requirements. For example, indication of "leader" instruction blocks, specification of wide memory loads, sharing operations, or other suitable execution requirements can be specified in the instruction block header 320. The instruction block header 320 can also indicate branch prediction or memory dependence prediction can be inhibited for certain instruction blocks, depending on the particular application. As another example, an execution flag can be used to control whether the instruction block is executed in the default execution mode or the debug execution mode.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The instruction block header 320 also includes a store mask which identifies the load-store queue identifiers that are assigned to memory store (and in some examples, memory load) operations. The instruction block header can also include a write mask, which identifies which global register(s) the associated instruction block will write. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

VI. Example Block-Based ISA Target Encoding

Figure 4:
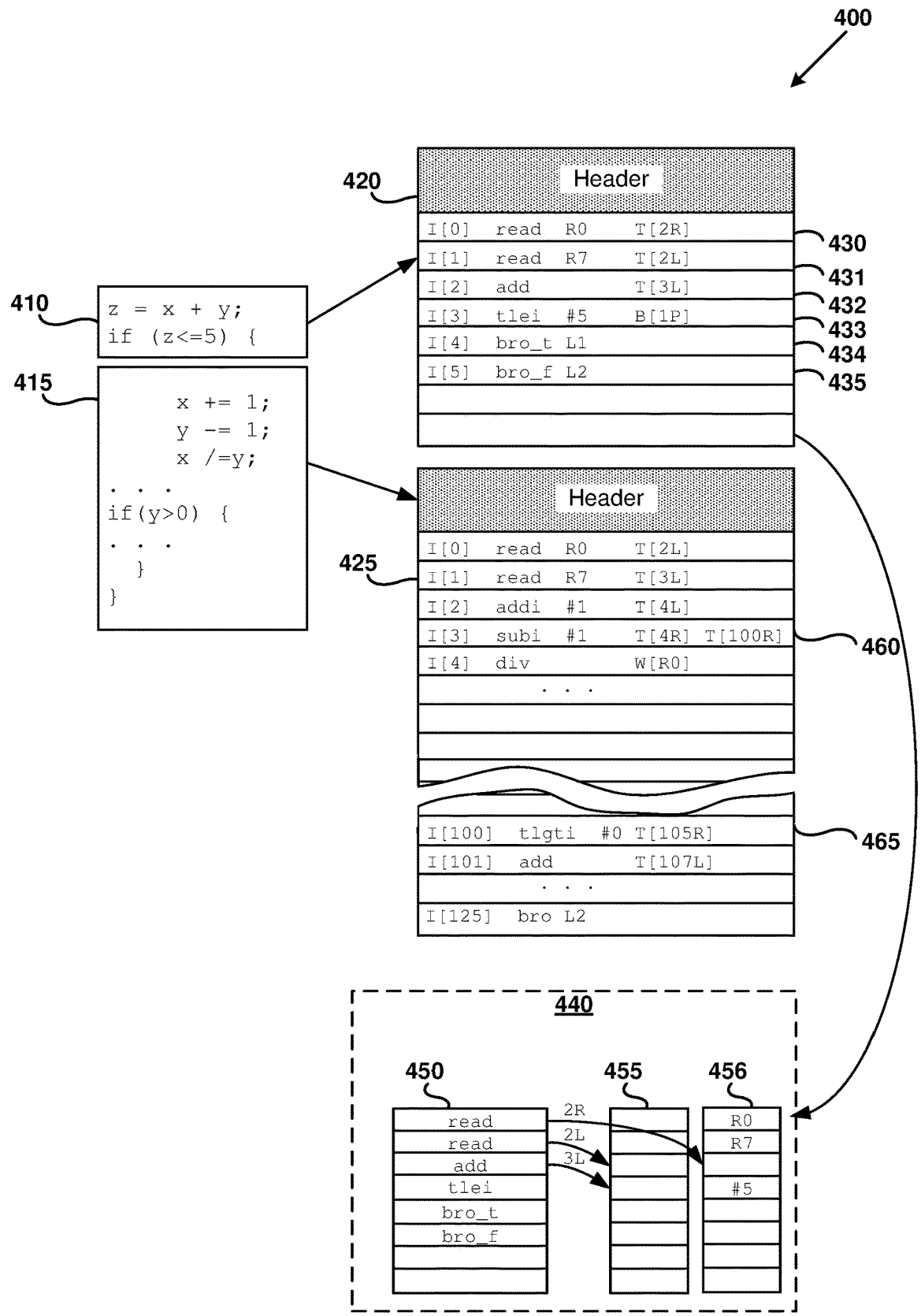
FIG. 4 illustrates portions of source code and respective instruction blocks.

FIG. 4 is a diagram 400 depicting an example of two portions 410 and 415 of C language source code and their respective instruction blocks 420 and 425 (in assembly language), illustrating how block-based instructions can explicitly encode their targets. The high-level C language source code can be translated to the low-level assembly language and machine code by a compiler whose target is a block-based processor. A high-level language can abstract out many of the details of the underlying computer architecture so that a programmer can focus on functionality of the program. In contrast, the machine code encodes the program according to the target computer's ISA so that it can be executed on the target computer, using the computer's hardware resources. Assembly language is a human-readable form of machine code.

In the following examples, the assembly language instructions use the following nomenclature: "I[<number>]" specifies the number of the instruction within the instruction block where the numbering begins at zero for the instruction following the instruction header and the instruction number is incremented for each successive instruction; the operation of the instruction (such as READ, ADDI, DIV, and the like) follows the instruction number; optional values (such as the immediate value 1) or references to registers (such as R0 for register 0) follow the operation; and optional targets that are to receive the results of the instruction follow the values and/or operation. Each of the targets can be to another instruction, a broadcast channel to other instructions, or a register that can be visible to another instruction block when the instruction block is committed. An example of an instruction target is T[1R] which targets the right operand of instruction 1. An example of a register target is W[R0], where the target is written to register 0.

In the diagram 400, the first two READ instructions 430 and 431 of the instruction block 420 target the right (T[2R]) and left (T[2L]) operands, respectively, of the ADD instruction 432. In the illustrated ISA, the read instruction is the only instruction that reads from the global register file; however any instruction can target, the global register file. When the ADD instruction 432 receives the result of both register reads it will become ready and execute.

When the TLEI (test-less-than-equal-immediate) instruction 433 receives its single input operand from the ADD, it will become ready and execute. The test then produces a predicate operand that is broadcast on channel one (B[1P]) to all instructions listening on the broadcast channel, which in this example are the two predicated branch instructions (BRO_T 434 and BRO_F 435). The branch that receives a matching predicate will fire.

A dependence graph 440 for the instruction block 420 is also illustrated, as an array 450 of instruction nodes and their corresponding operand targets 455 and 456. This illustrates the correspondence between the instruction block 420, the corresponding instruction window entries, and the underlying dataflow graph represented by the instructions. Here decoded instructions READ 430 and READ 431 are ready to issue, as they have no input dependencies. As they issue and execute, the values read from registers R6 and R7 are written into the right and left operand buffers of ADD 432, marking the left and right operands of ADD 432 "ready." As a result, the ADD 432 instruction becomes ready, issues to an ALU, executes, and the sum is written to the left operand of TLEI 433.

In some examples, a larger instruction block may be processed in smaller portions to allow for allocation of processor resources to execute the block. For example, a processor adapted to execute up to 128-word instruction blocks can be configured to process to the blocks in 32-word portions. However, instruction results may need to be passed between instruction block portions in certain examples. For example, the subi #1 instruction 460 targets both the right operand of instruction number 4 ("T[4R]") and the right operand of instruction number 100 ("T[100R]"). Thus, when a processor is configured to process the instruction block in smaller portions, a results buffer is used to temporarily store the target operands of the instruction until the target instruction 465 can consume its input operand(s).

As a comparison, a conventional out-of-order RISC or CISC processor would dynamically build the dependence graph at runtime, using additional hardware complexity, power, area, and reducing clock frequency and performance. However, the dependence graph is known statically at compile time and an EDGE compiler can directly encode the producer-consumer relations between the instructions through the ISA, freeing the microarchitecture from rediscovering them dynamically. This can potentially enable a simpler microarchitecture, reducing area, power and boosting frequency and performance.

VII. Example Block-Based Instruction Formats

FIG. 5 is a diagram illustrating generalized examples of instruction formats for an instruction header 510, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a number of exit type fields 511, a number of execution flag fields, an instruction block size field 512, and an instruction header ID bit (the least significant bit of the instruction header). In some examples, the instruction header 510 includes additional metadata 515, which can be used to control additional aspects of instruction block execution and performance. This includes cache organization, execution lane organization, leader/follower instruction windows, or other forms of control to assist with implementing wide memory load execution with wide cache lines.

The execution flag fields depicted in FIG. 5 occupy bits 6 through 13 of the instruction block header 510 and indicate one or more modes of operation for executing the instruction block. For example, the modes of operation can include core fission operation (e.g., by specifying whether the instruction block is to be executed using all or a portion, or with a quantity of execution resources), vector mode operation, branch predictor inhibition, memory dependence predictor inhibition, block synchronization, break after block, break before block, block fall through, and/or in-order or deterministic instruction execution. The block synchronization flag occupies bit 9 of the instruction block and inhibits speculative execution of the instruction block when set to logic 1.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. Addresses can be calculated for next instruction blocks to be speculatively executed and stored in an instruction block address register. In some examples, up to six exit types can be encoded in the exit type fields, and the correspondence between fields and corresponding explicit or implicit control flow instructions can be determined by, for example, examining control flow instructions in the instruction block.

The illustrated generic block instruction 520 is stored as one 32-bit word and includes an opcode field, a predicate field, a broadcast ID field (BID), a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specify the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. The execution flow is modified by changing the value of an instruction block address register (e.g., using a branch instruction to implicitly change the value to point to the memory location of the next instruction block to execute), while in other examples, the execution flow can be changed by modifying a value stored at a designated location in virtual memory (e.g., by a memory controller configured to detect reads and write to designated memory location and store/load the values to an instruction block address register). In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), an immediate field (IMM) offset field, and a target field. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory).

VIII. Example States of a Processor Core

Figure 6:
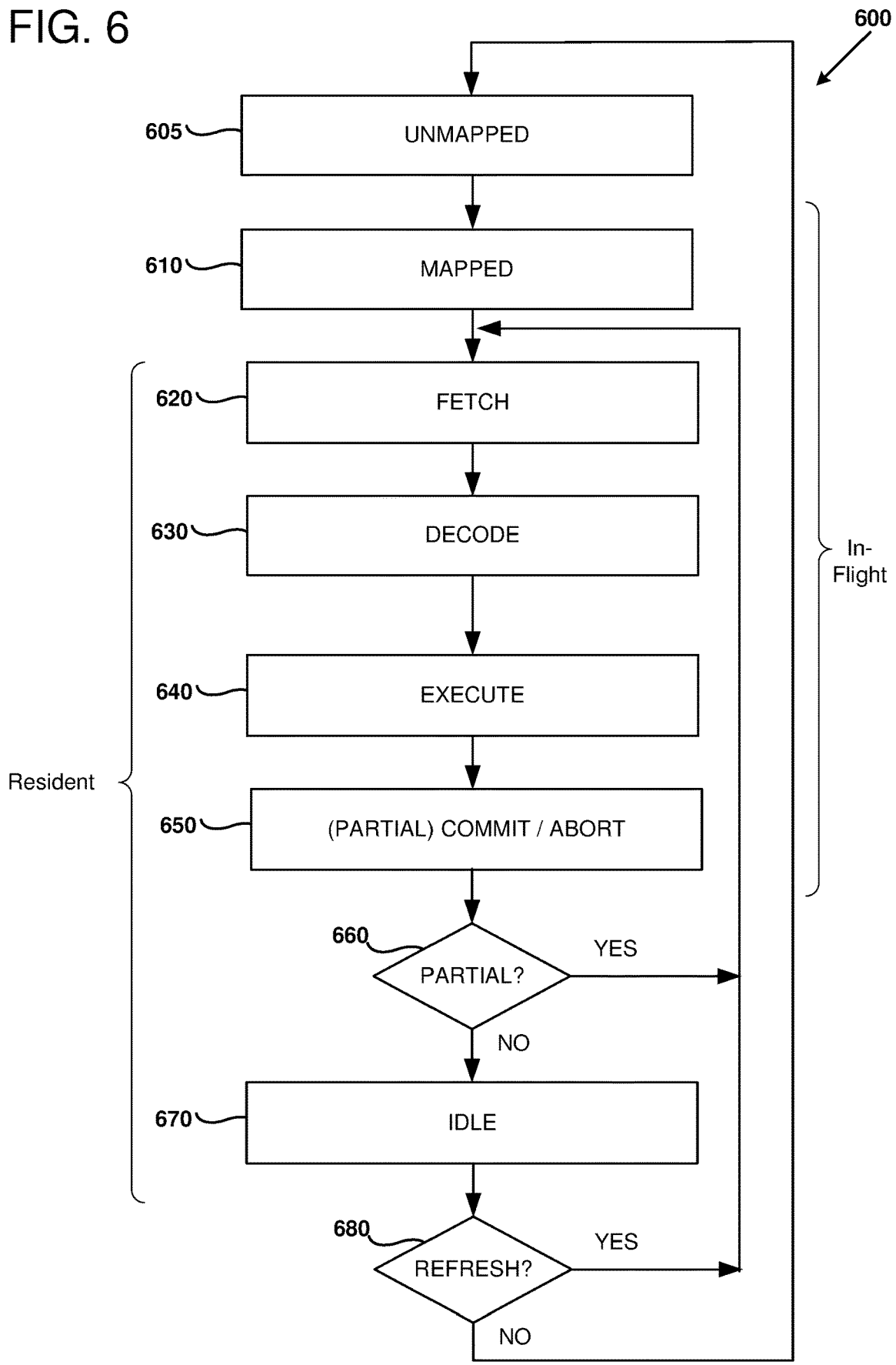
FIG. 6 is a flowchart illustrating an example of a progression of states of a processor core of a block-based processor.

FIG. 6 is a flowchart illustrating an example of a progression of states 600 of a block-based processor core example of a computer implemented according to the disclosed technology. The computer includes multiple processor cores that are collectively used to run or execute a software program. The program can be written in a variety of high-level languages and then compiled for the block-based processor using a compiler that targets the block-based processor. The compiler can emit code that, when run or executed on the block-based processor, will perform the functionality specified by the high-level program. The compiled code can be stored in a computer-readable memory that can be accessed by the block-based processor. The compiled code can include a stream of instructions grouped into a series of instruction blocks. During execution, one or more of the instruction blocks can be executed by the block-based processor to perform the functionality of the program. Typically, the program will include more instruction blocks than can be executed on the cores at any one time. Thus, blocks of the program are mapped to respective cores, the cores perform the work specified by the blocks, and then the blocks on respective cores are replaced with different blocks until the program is complete. Some of the instruction blocks may be executed more than once, such as during a loop or a subroutine of the program. An "instance" of an instruction block can be created for each time the instruction block will be executed. Thus, each repetition of an instruction block can use a different instance of the instruction block. As the program is run, the respective instruction blocks can be mapped to and executed on the processor cores based on architectural constraints, available hardware resources, and the dynamic flow of the program. During execution of the program, the respective processor cores can transition through a progression of states 600, so that one core can be in one state and another core can be in a different state.

At state 605, a state of a respective processor core can be unmapped. An unmapped processor core is a core that is not currently assigned to execute an instance of an instruction block. For example, the processor core can be unmapped before the program begins execution on the block-based computer. As another example, the processor core can be unmapped after the program begins executing but not all of the cores are being used. In particular, the instruction blocks of the program are executed, at least in part, according to the dynamic flow of the program. Some parts of the program may flow generally serially or sequentially, such as when a later instruction block depends on results from an earlier instruction block. Other parts of the program may have a more parallel flow, such as when multiple instruction blocks can execute at the same time without using the results of the other blocks executing in parallel. Fewer cores can be used to execute the program during more sequential streams of the program and more cores can be used to execute the program during more parallel streams of the program.

At state 610, the state of the respective processor core can be mapped. A mapped processor core is a core that is currently assigned to execute an instance of an instruction block. When the instruction block is mapped to a specific processor core, the instruction block is in-flight. An in-flight instruction block is a block that is targeted to a particular core of the block-based processor, and the block will be or is executing, either speculatively or non-speculatively, on the particular processor core. In particular, the in-flight instruction blocks correspond to the instruction blocks mapped to processor cores in states 610-650. A block executes non-speculatively when it is known during mapping of the block that the program will use the work provided by the executing instruction block. A block executes speculatively when it is not known during mapping whether the program will or will not use the work provided by the executing instruction block. Executing a block speculatively can potentially increase performance, such as when the speculative block is started earlier than if the block were to be started after or when it is known that the work of the block will be used. However, executing speculatively can potentially increase the energy used when executing the program, such as when the speculative work is not used by the program.

A block-based processor includes a finite number of homogeneous or heterogeneous processor cores. A typical program can include more instruction blocks than can fit onto the processor cores. Thus, the respective instruction blocks of a program will generally share the processor cores with the other instruction blocks of the program. In other words, a given core may execute the instructions of several different instruction blocks during the execution of a program. Having a finite number of processor cores also means that execution of the program may stall or be delayed when all of the processor cores are busy executing instruction blocks and no new cores are available for dispatch. When a processor core becomes available, an instance of an instruction block can be mapped to the processor core.

An instruction block scheduler can assign which instruction block will execute on which processor core and when the instruction block will be executed. The mapping can be based on a variety of factors, such as a target energy to be used for the execution, the number and configuration of the processor cores, the current and/or former usage of the processor cores, the dynamic flow of the program, whether speculative execution is enabled, a confidence level that a speculative block will be executed, and other factors. An instance of an instruction block can be mapped to a processor core that is currently available (such as when no instruction block is currently executing on it). In one embodiment, the instance of the instruction block can be mapped to a processor core that is currently busy (such as when the core is executing a different instance of an instruction block) and the later-mapped instance can begin when the earlier-mapped instance is complete.

At state 620, the state of the respective processor core can be fetch. For example, the IF pipeline stage of the processor core can be active during the fetch state. Fetching an instruction block can include transferring the block from memory (such as the L1 cache, the L2 cache, or main memory) to the processor core, and reading instructions from local buffers of the processor core so that the instructions can be decoded. For example, the instructions of the instruction block can be loaded into an instruction cache, buffer, or registers of the processor core. Multiple instructions of the instruction block can be fetched in parallel (e.g., at the same time) during the same clock cycle. The fetch state can be multiple cycles long and can overlap with the decode (630) and execute (640) states when the processor core is pipelined.

When instructions of the instruction block are loaded onto the processor core, the instruction block is resident on the processor core. The instruction block is partially resident when some, but not all, instructions of the instruction block are loaded. The instruction block is fully resident when all instructions of the instruction block are loaded. The instruction block will be resident on the processor core until the processor core is reset or a different instruction block is fetched onto the processor core. In particular, an instruction block is resident in the processor core when the core is in states 620-670.

At state 630, the state of the respective processor core can be decode. For example, the DC pipeline stage of the processor core can be active during the fetch state. During the decode state, instructions of the instruction block are being decoded so that they can be stored in the memory store of the instruction window of the processor core. In particular, the instructions can be transformed from relatively compact machine code, to a less compact representation that can be used to control hardware resources of the processor core. The decode state can be multiple cycles long and can overlap with the fetch (620) and execute (640) states when the processor core is pipelined. After an instruction of the instruction block is decoded, it can be executed when all dependencies of the instruction are met.

At state 640, the state of the respective processor core can be execute. The execute state can include various modes of operation, such as a default execution mode and a debug mode. During the default mode of the execute state, instructions of the instruction block are being executed. In particular, the EX and/or LS pipeline stages of the processor core can be active during the execute state. The instruction block can be executing speculatively or non-speculatively. A speculative block can execute to completion or it can be terminated prior to completion, such as when it is determined that work performed by the speculative block will not be used. When an instruction block is terminated, the processor can transition to the abort state. A speculative block can complete when it is determined the work of the block will be used, all register writes are buffered, all writes to memory are buffered, and a branch target is calculated, for example. A non-speculative block can execute to completion when all register writes are buffered, all writes to memory are buffered, and a branch target is calculated, for example. The execute state can be multiple cycles long and can overlap with the fetch (620) and decode (630) states when the processor core is pipelined. When the instruction block is complete, the processor can transition to the commit state.

During the debug mode of the execute state, instructions of the instruction block can be single-stepped or executed one at a time. For example, the processor core can be halted in the debug mode of the execute state, such as when a control signal is asserted or when the instruction header specifies that the debug mode is to be used for the instruction block. Upon receiving an indication to perform a single-step operation, one instruction of the instruction block can be executed. The intermediate state of the processor core can be scanned or read out of the processor core. The process can be repeated for the next instruction of the instruction block upon receiving another indication to perform a single-step operation. The "next" instruction can be determined based on a compiler-generated order, a scheduler-generated order, or an order generated outside of the processor core (such as by debug software running on a different core). The instructions of the block can continue to be single-stepped until the commit conditions are met, and then the processor can transition to the commit state.

At state 650, the state of the respective processor core can be set to commit or abort. During commit, the work of the instructions of the instruction block can be atomically committed so that other blocks can use the work of the instructions. In particular, the commit state can include a commit phase where locally buffered architectural state is written to architectural state that is visible to or accessible by other processor cores. When the visible architectural state is updated, a commit signal can be issued and the processor core can be released so that another instruction block can be executed on the processor core. During the abort state, the pipeline of the core can be halted to reduce dynamic power dissipation. In some applications, the core can be power gated to reduce static power dissipation. At the conclusion of the commit/abort states, the processor core can receive a new instruction block to be executed on the processor core, the core can be refreshed, the core can be idled, or the core can be reset.

In certain examples of the disclosed technology, an instruction block is divided into portions and the individual portions are executed using different spatially and/or temporally allocated resources. For example, an execution slice of a processor may be adapted to handle 32-word portions of an instruction block. When all the instructions of a portion have executed, then the results produced by this respective portion may be partially committed. In some examples, the partially committed results are actually written to an architectural register file, temporarily stored in a physical register file, and/or actually written to memory. In other examples, the partially committed results are temporarily stored until it is determined whether the entire instruction block will be committed or aborted.

At state 660, it can be determined if the instruction block has additional portions to fetch, decode and execute. For example, if the instruction block size is greater than the maximum number of instructions that can be processed by the current context's allocated resources, results from the current portion are stored in a results buffer, and the processor proceeds to state 620 in order to fetch, decode, and execute instructions for a subsequent portion of the instruction block. In some examples, the portions may be concurrently fetched, decoded, and executed by allocating multiple slices of execution logic to the context. If the instruction block size is equal or less than the maximum number of instructions that can be processed by the current context's allocated resources, or if there are no remaining portion of the current instruction block to execute, the processor proceeds to state 670.

At state 670, the state of the respective processor core can be idle. The performance and power consumption of the block-based processor can potentially be adjusted or traded off based on the number of processor cores that are active at a given time. For example, performing speculative work on concurrently running cores may increase the speed of a computation but increase the power if the speculative misprediction rate is high. As another example, immediately allocating new instruction blocks to processors after committing or aborting an earlier executed instruction block may increase the number of processors executing concurrently, but may reduce the opportunity to reuse instruction blocks that were resident on the processor cores. Reuse may be increased when a cache or pool of idle processor cores is maintained. For example, when a processor core commits a commonly used instruction block, the processor core can be placed in the idle pool so that the core can be refreshed the next time that the same instruction block is to be executed. As described above, refreshing the processor core can save the time and energy used to fetch and decode the resident instruction block. The instruction blocks/processor cores to place in an idle cache can be determined based on a static analysis performed by the compiler or a dynamic analysis performed by the instruction block scheduler. For example, a compiler hint indicating potential reuse of the instruction block can be placed in the header of the block and the instruction block scheduler can use the hint to determine if the block will be idled or reallocated to a different instruction block after committing the instruction block. When idling, the processor core can be placed in a low-power state to reduce dynamic power consumption, for example.

At state 680, it can be determined if the instruction block resident on the idle processor core can be refreshed. If the core is to be refreshed, the block refresh signal can be asserted and the core can transition to the execute state (640). If the core is not going to be refreshed, the block reset signal can be asserted and the core can transition to the unmapped state (605). When the core is reset, the core can be put into a pool with other unmapped cores so that the instruction block scheduler can allocate a new instruction block to the core.

IX. Example Processor Microarchitecture with Sharding Circuit

Figure 7:
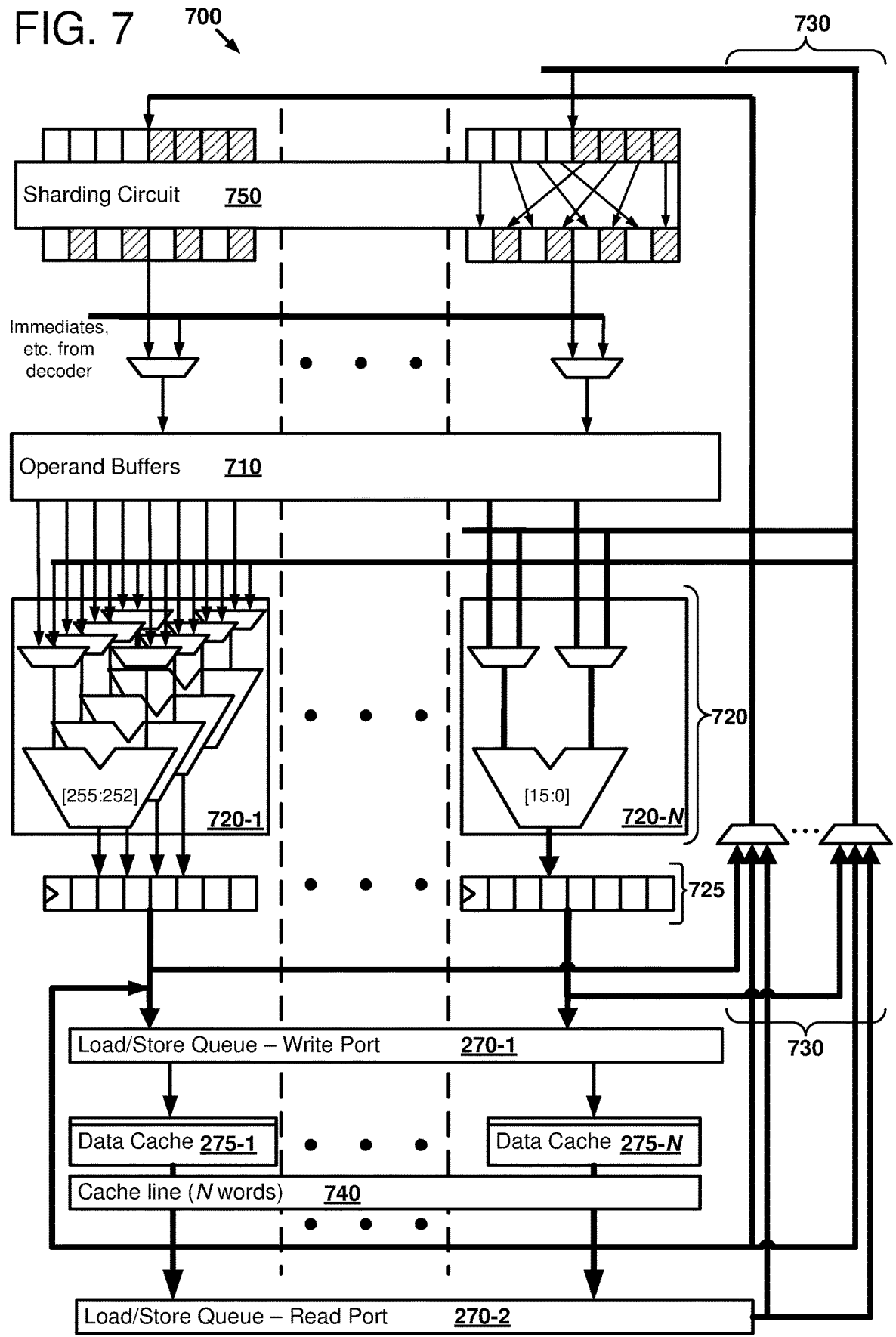
FIG. 7 is a block diagram illustrating an example data path having a writeback circuit and a sharding circuit, as can be implemented in certain examples of the disclosed technology.

FIG. 7 is a block diagram 700 outlining an example microarchitecture for a processor datapath in which certain aspects of the disclosed technology can be implemented. For example, processors implementing general purpose RISC ISAs, CISC ISAs, block-based processor ISAs, including EDGE ISAs, or other ISAs can be implemented using architectures similar to that illustrated in the block diagram 700. The microarchitecture depicted can be implemented in any suitable technology, including as an integrated circuit, an SOC, or with programmable logic, such as in an FPGA. The example microprocessor microarchitecture can include one or more register files (e.g., such as the register file 290 discussed above) and other components, which are not depicted to simplify explanation of other depicted features.

As shown in FIG. 7, the example datapath includes a set of operand buffers 710, which store operand data to be processed by a number of execution units 720. The execution units 720 output the results of their operations to a number of pipeline registers 725. Data from the pipeline registers 725 is output to a write port 270-1 of the load/store queue 270 and to a writeback circuit 730. In contrast to "writeback" operations in traditional CISC processors, which send data to the register file, the disclosed writeback circuit 730 can send data from the execution units 720 (e.g., via the pipeline registers 725) to the operand buffers 710 or in some cases, bypass the operand buffers and send data to the execution units.

The data path of the example microarchitecture is divided into a number of segments or "execution lanes," as indicated by the dashed lines. In the illustrated example, there are sixteen execution lanes, each of the lanes processing a 16-bit word (e.g., bits 255:252 or 15:0). The operand buffers 710 store operands for each of the sixteen segments. Each of the execution units 720 can include in one or more suitable execution units, including but not limited to: adders, multipliers, arithmetic and logic units (ALUs), shifters, rotators, floating point units, or other such suitable execution units. The control unit for the processor generates control signals that are used to configure operation of the execution units 720.

The microarchitecture further includes the data cache 275, which in this example is arranged in a number of banks, 275-1 ... 275-N. The data cache 275 can output a plurality of N words at a time, one word from each bank of the data cache. As used herein, a collection of two or more words output from the data cache 275 at a single time is dubbed a "cache line." The cache line of data is output by a wide memory load circuit that concurrently loads to or more words from a cache line of the data cache 275. By having a wide cache line, a large amount of data can be read from memory in a particular clock cycle of the processor. In some examples, the words forming the data output by the cache line are arranged adjacently in memory. In the example of FIG. 7, the cache line includes 16 words, each of the words having 16 bits. In other examples, different numbers of words and different size words may be employed. In other examples, other arrangements of the words may be provided with further configuration of a memory management unit (MMU) that controls operation of the data cache. An entire cache line worth of data can be output directly to the writeback circuit 730. Data from the cache line can alternatively be output to a read port 270-2 of the load/store queue (LSQ).

As shown FIG. 7, the writeback circuit 730 can receive data from three sources: results operands received from the output of the pipeline registers 725, data for an entire cache line of data from the data cache 275, or data from the read port 270-2 of the load/store queue. The writeback circuit 730 can output data to a sharding circuit 750, which rearranges input data prior to sending to the operand buffers 710. The illustrated writeback circuit 730 can also bypass the operand buffers 710 and send data directly to the execution unit 720. Thus, the writeback circuit 730 can send data to be stored in the operand buffers 710. In some examples, data that is not going to be used by other instructions of an instruction block or otherwise does not need to be stored can be sent directly to the execution units 720 via bypass path. The writeback circuit 730 can be implemented using any suitable interconnect and logic technology. For example, interconnect wires can bring data to selection logic, such as a logic multiplexer, pass-gate multiplexer, transmission gate multiplexer, tri-state bus, or other suitable selection logic. For photonic circuit implementations of the disclosed technology, logically equivalent selection logic and interconnect routing can be used.

In the illustrated example, the writeback circuit 730 sends data from a selected one of the three depicted sources to a sharding circuit 750 that is coupled to the input of the operand buffers 710. In other examples, there is no sharding circuit. In other examples, the sharding circuit may be situated between the operand buffers 710 and the execution units 720, or be situated between the output of the execution pipeline registers 725 and the load store queue 270 or writeback circuit 730. In other examples, a sharding circuit can be situated at the output of the cache line 740 and send data on to the writeback circuit 730.

The sharding circuit 750 can perform various manipulations of data operands received. In the illustration of FIG. 7, the sharding circuit 750 is performing bitwise interleaving of bits within each individual received word. In other examples, the sharding circuit 750 can rearrange received words, for example by shifting individual words one or more words over, by rotating words, by transposing bits within the words, swapping words, extracting words, and/or extending words. In some examples, the sharding circuit 750 is coupled to the wide memory load circuit cache line 740 and is configured to select individual words from the cache line 740 and send each of the selected words to a selected writeback channel of the writeback circuit 730 or to selected execution lanes of the operand buffers 710. In some examples, each input word to the sharding circuit 750 his output to the respective output word lane. In other examples, one or more but not all of the input words are selected and output. In some examples, the sharding circuit can be configured to mask one or more output words (e.g., with a predetermined pattern of all ones, all zeroes, or other predetermined pattern of ones and zeroes).

Also shown in FIG. 7, the execution units 720 can be configured to operate in a scaler mode, where data for each of the execution lanes is processed as a complete set of bits, for example as shown on the right execution unit 720-N, where the ALU is configured to operate on an entire 16-bit word of data, or for smaller numbers of bits in SIMD operation, where the left ALU of the execution unit 720-1 is configured to perform operations on four individual 4-bit chunks of data using a reconfigured 16-bit ALU.

The example microarchitecture of FIG. 7 can further include additional selection and/or multiplexing logic. For example, the operand buffers 710 may be configured to receive data from other sources besides the sharding circuit 750. For example, immediate values or register values can be received at the inputs to the operand buffer 710. In some examples, the sharding circuit 750 can be configured to pass through non-rearranged data, without bit-wise or word-wise manipulations of the input data.

A processor datapath configured according to the microarchitecture of FIG. 7 can be configured to perform a method comprising concurrently loading a plurality of two or more words from a single word of the data cache line 740 and sending a selected word of the plurality of words to a selected one of the execution lanes of the processor. For example, the sharding circuit 750 can select one word from the received cache line 740 and send it to a selected execution lane of the operand buffers 710.

In some examples, the microarchitecture further includes separate level one (L1) instruction cache and L1 data cache 275. In some examples or configurations, the instruction cache and the data cache 275 can be shared across all active contexts. In other examples, one or both of the instruction cache and data cache 275 are partitioned into a number N of separate banks (e.g., 275-1, 275-2, ..., 275-N). In examples, additional control logic is used to maintain cache coherency.

Each of the execution units 720 (e.g., 720-1 or 720-N) contain execution logic used for performing operations associated with instructions, for example, instructions in an EDGE instruction block. The example microarchitecture processor can be configured such that the execution lanes are allocated to one, two, three, or four different contexts. For example, all of the execution units 720 can be allocated for execution of a single context by the processor. The processor can later be reconfigured such that a first execution unit 720-1 is used to execute a first context, a second execution unit is used to execute a second context, and so forth. In other examples, vector operation can be implemented by configuring one of the execution lanes to be a "leader" lane, and configuring the other execution lanes to follow operation of the leader lane.

Each of the execution lanes can be configured to include similar execution resources, including, by example, an instruction window segment, a first portion of the operand buffer 710, and second portion of the operand buffer 710, and one or more execution units, including, for example, execution units 720-1 or 720-N. The illustrated execution units can include, for example, integer arithmetic and logic units (ALU), adders, subtractors, multipliers, dividers, shifters, rotators, or other suitable execution units. In some examples, a floating point unit (FPU) is included and can be shared by any of the contexts executing with any of the illustrated functional slices 761-764. In other examples, FPUs and other specialized logic, such as DSPs or graphics functions can be shared, or can be included within an execution lane and thus not shared outside of the context currently assigned to the slice or slices.

The instruction window segment for at least the leader execution lane stores information such as decoded instructions, state information for the current execution state of the instruction block, as well as control logic for controlling execution of the context upon the instruction slice or slices. In some examples, an execution lane can execute more than one instruction per clock cycle (e.g., by using plural arithmetic or logic units within an execution lane). The instruction window segment can further include logic for providing control speculation. The operand buffers temporarily store operands generated for and consumed by instructions within an instruction block mapped to the functional slice. For example, in an EDGE ISA, data operands generated by an instruction can be temporarily stored in one of the operand buffers before being used by one of the functional units, and the result sent to the instructions target.

X. Example Microarchitecture Configured for Word Sharding Operation

Figure 8:
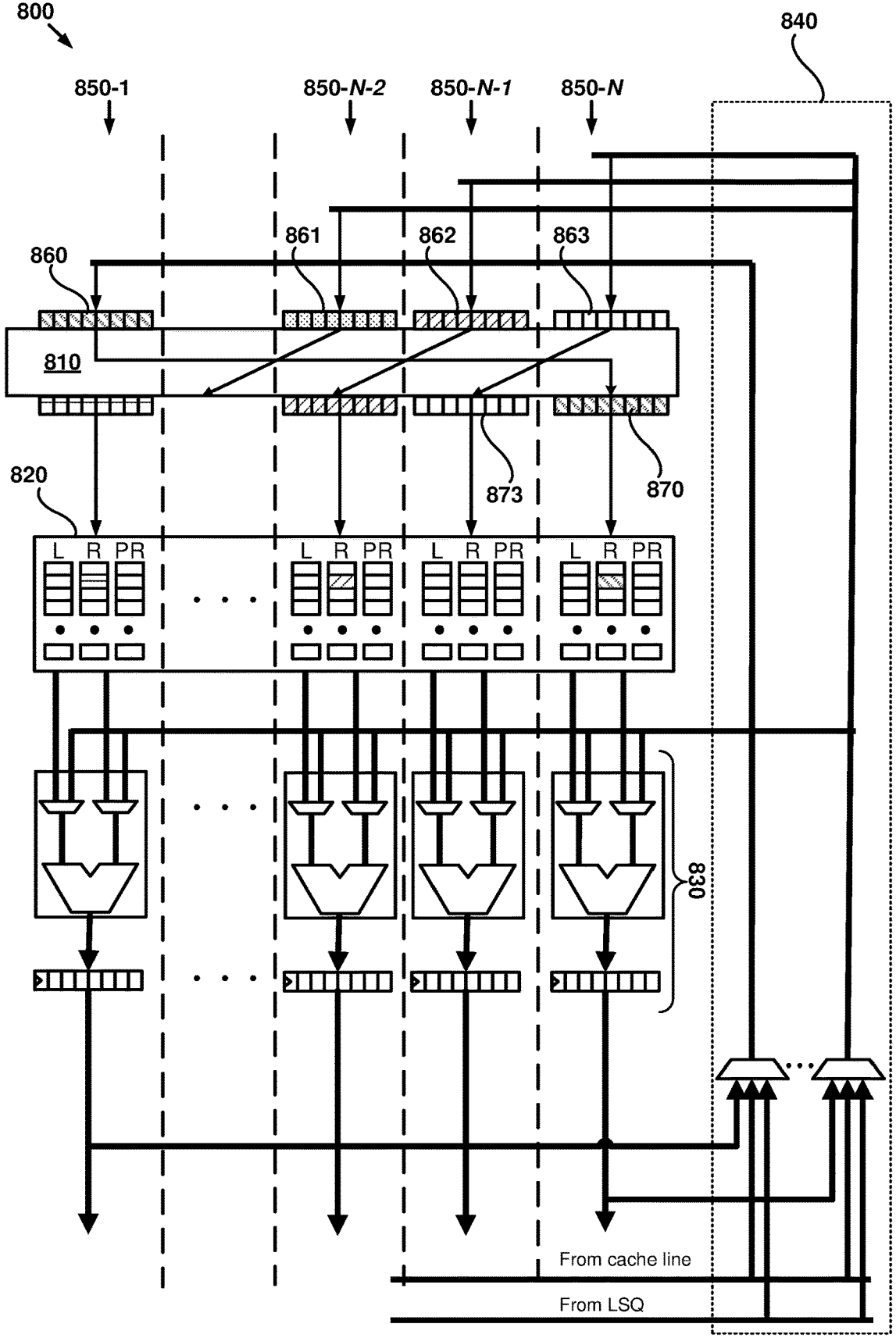
FIG. 8 is a block diagram illustrating an example data path having a byte-wise sharding circuit, as can be implemented in certain examples of the disclosed technology.

FIG. 8 is a block diagram 800 depicting an example micro architecture data path that has been configured to perform word-wise sharding, as can be performed in certain examples of the disclosed technology. The data path includes a sharding circuit 810, operand buffers 820, execution units 830, and a wide memory load circuit coupled to a writeback path 840. The sharding circuit 810, the operand buffers 820, and the execution units 830 are arranged into a plurality of execution lanes 850-1 through 850-N. As shown, data read from the writeback circuit 840 has input as a number of individual words 860, 861, 862, 863, etc. The sharding circuit outputs each of the words at a relative position that is one word to the left. For example, input word 863 is output as a word 873, one execution lane over. The leftmost input word 860 is wrapped to be output at the right most output word 870. Thus, the sharding circuit 810 performs word-wise sharding, unlike the configuration shown in FIG. 7, where the sharding circuit 750 manipulates bits within a word on a single or multiple bit basis.

XI. Example Microarchitecture Configured for Bypass Operation

Figure 9:
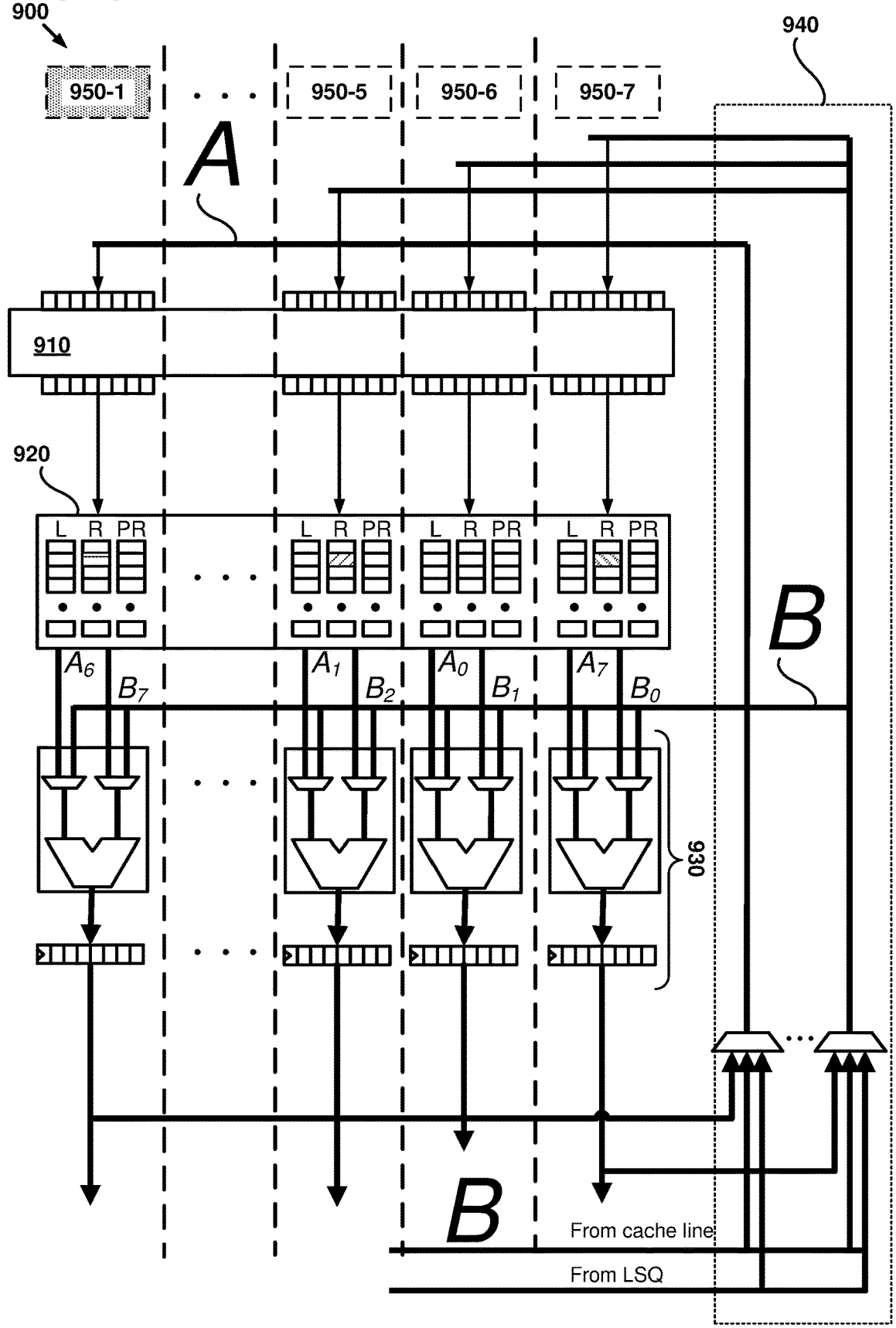
FIG. 9 is a block diagram illustrating an example data path having a bypass writeback path controlled by a leader instruction window, as can be implemented in certain examples of the disclosed technology.

FIG. 9 as a block diagram 900 of an example micro architecture for a processor data path, as can be implemented in certain examples of the disclosed technology. As shown in FIG. 9, a first wide cache line of data A has been read from a wide data cache line and provided as input to a sharding circuit 910. The sharding circuit 910 can perform various manipulations as discussed above, including bitwise and word-wise manipulations. The output of the sharding circuit 910 is stored in a number of operand buffers. On a subsequent clock cycle, a second wide cache line of data B is output and sent by the writeback circuit 940 along a bypass path directly to the execution units 930. For example, the data B can be sent in the very next clock cycles after the first wide cache line A is loaded. In other examples, one or more clock cycles intervenes between the read of A and B by the writeback circuit 940. Control logic is used to configure the execution unit selection logic to select a word (e.g., $A_0$, $A_1$, or $A_7$) of operand data to combine with a word of the operand data B (e.g., $B_1$, $B_2$, or $B_0$, respectively) for performing an arithmetic or logical operation. Each of the words of operand data A (e.g., $A_0$, $A_1$, or $A_7$) has been shifted one position to the left by the sharding circuit 910. The second wide word of cache line data B is not shifted in this example. For example, the products $A_0 B_1$, $A_1 B_2$, and/or $A_7 B_0$, are generated when the execution units 930 are configured to perform multiplication for the respective input of an execution lane. Thus, complex operations can be performed relatively quickly through the use of the sharding circuit 910 and bypass path provided by the writeback circuit 940.

As shown in FIG. 9, the sharding circuit 910, the operand buffers 920, the execution units 930, and the instruction windows 950 are all configured as separate segments or execution lanes. In the illustrated example, a first instruction window 950-1 is designated as the "leader" instruction window. Control signals generated by the leader instruction window 950-1 can be used to control operation of the follower's instruction windows, for example instruction windows 950-5, 950-6, and/or 950-7. In other examples, one or more of the instruction windows can operate independently of the leader instruction window 950-1.

XII. Example Microarchitecture with Fewer Execution Units Per Segment

Figure 10:
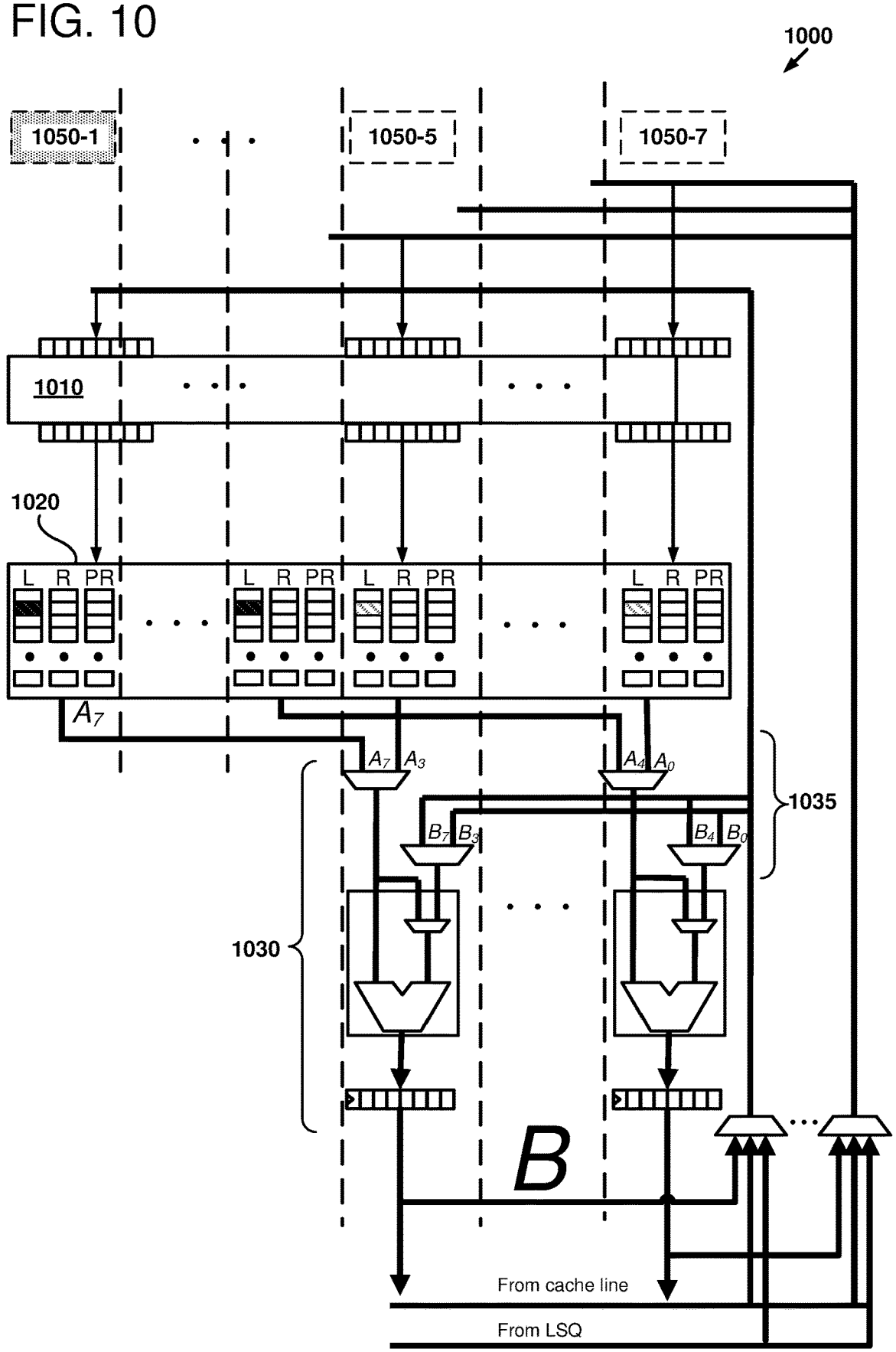
FIG. 10 is a block diagram illustrating an example data path having fewer execution units than execution lanes, as can be implemented in certain examples of the disclosed technology.

FIG. 10 is a block diagram 1000 outlining an example micro architecture datapath for performing wide load memory operations, as can be performed in certain examples of the disclosed technology. Similar to the micro architecture discussed above regarding FIG. 9, a leader instruction window 1050-1, a sharding circuit 1010, and operand buffers 1020 are configured into eight execution lanes. But, in this example, the data path includes half the number of execution units 1030. Additional multiplexer logic 1035 has been added in order to select either a high portion of words from the operand buffer 1020 or a low portion of words from the operand buffer. Thus, operations requiring data for all eight execution lanes can be performed across two clock cycles by processing one half of the execution lanes using the execution units 1030 during a first clock cycle and then processing operations for a second half of the execution lanes using the execution units in a second clock cycle. In this manner, integrated circuit real estate can be conserved by reducing the amount active device area and interconnect resources dedicated to the execution units 1030.

XIII. Example Microarchitecture with Fewer Execution Units

Figure 11A:
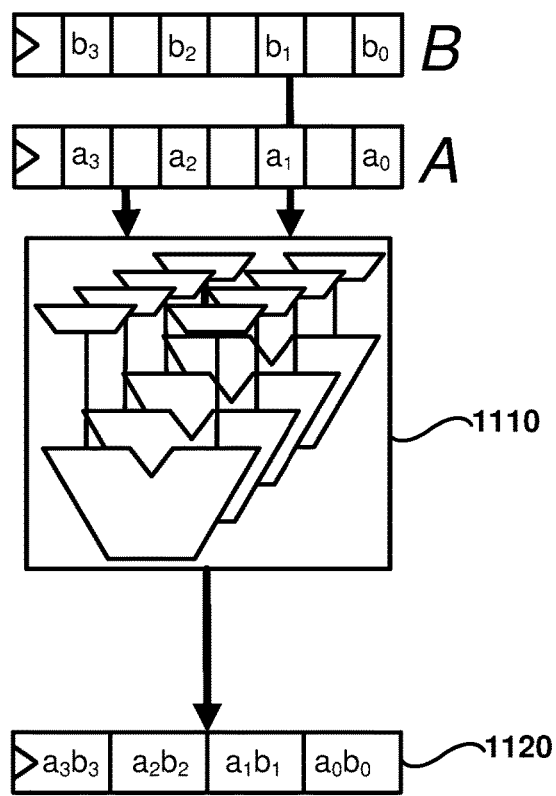
FIGS. 11A-C illustrate a method of performing a multiply-reduce operation, as can be performed in certain examples of the disclosed technology.

FIGS. 11A-11 C outline an example portion of an execution lane while performing a multiply-reduce operation, as can be performed in certain examples of the disclosed technology. For example, the reconfigured execution units 720 discussed above can be reconfigured to perform the depicted operations. As shown in FIG. 11A, a 32-bit wide execution unit 1110 is configured into four individual 8-bit SIMD units. A sharding circuit has been used to arrange data received from the data cache into interlaced, zero-padded packets of 4-bits as shown. For example, a first wide 16-bit wide data cache line input A is unpacked into 4-bit portions: $a_0$, $a_1$, $a_2$, and $a_3$. A second, 16-bit wide data cache line input B is also arranged into 4-bit portions $b_0$, $b_1$, $b_2$, and $b_3$. These values are output from an operand buffer (and/or bypass path of a writeback circuit) into the execution unit 1110, which performs parallel SIMD operations to generate four 8-bit products $a_0b_0$, $a_1b_1$, $a_2b_2$, and $a_3b_3$ stored in an output register 1120.

Figure 11B:
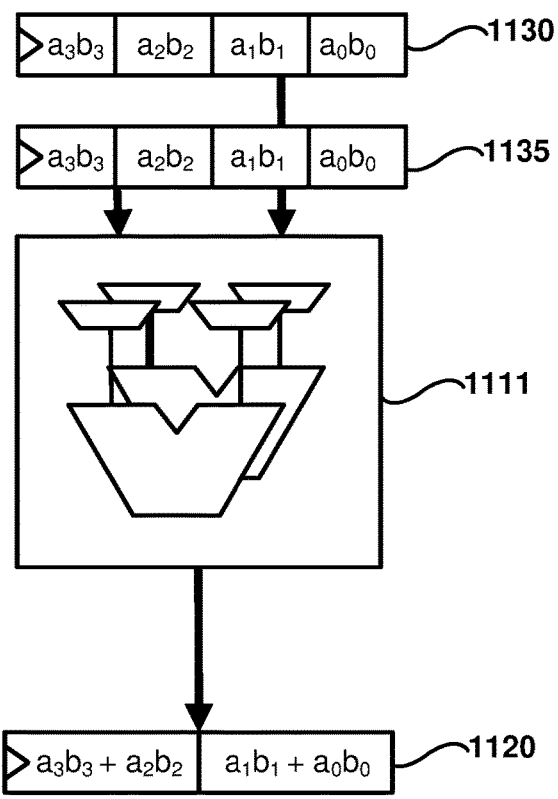

FIG. 11B shows the state of the datapath after the values in the output register 1120 have been copied to two operand buffer registers 1130 and 1135. The execution unit 1110 is reconfigured 1111 to add the two 8-bit wide terms, producing two 16-bit wide outputs. Thus, the partially reduced products are temporarily stored in the output register 1120.

Figure 11C:
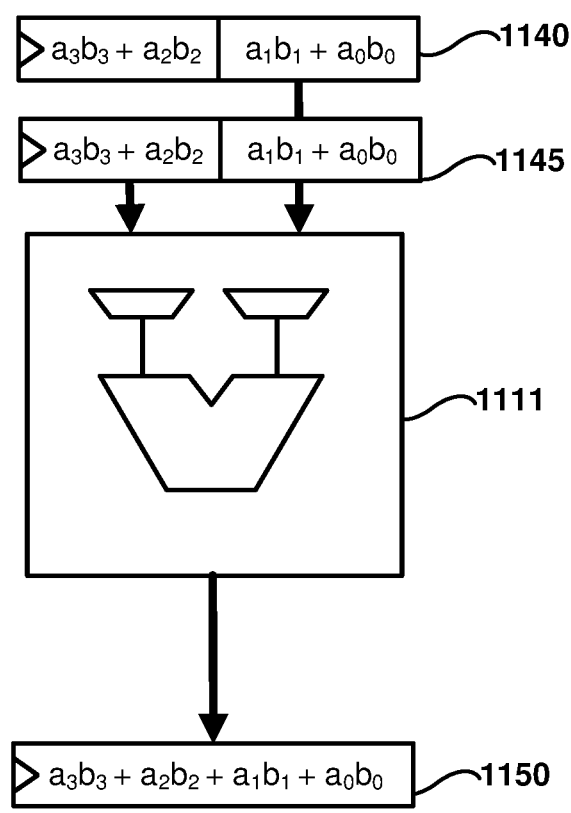

FIG. 11C depicts the data path after the intermediate product 1130 has been copied into two operand buffers 1140 and 1145. These operand buffers are combined in a single 16-bit operation producing a completed 32-bit output 1150 which is the reduction of all of the products produced at the first step shown in FIG. 11A.

XIV. Example Alternative Arrangements of Sharding Circuit

Figure 12:
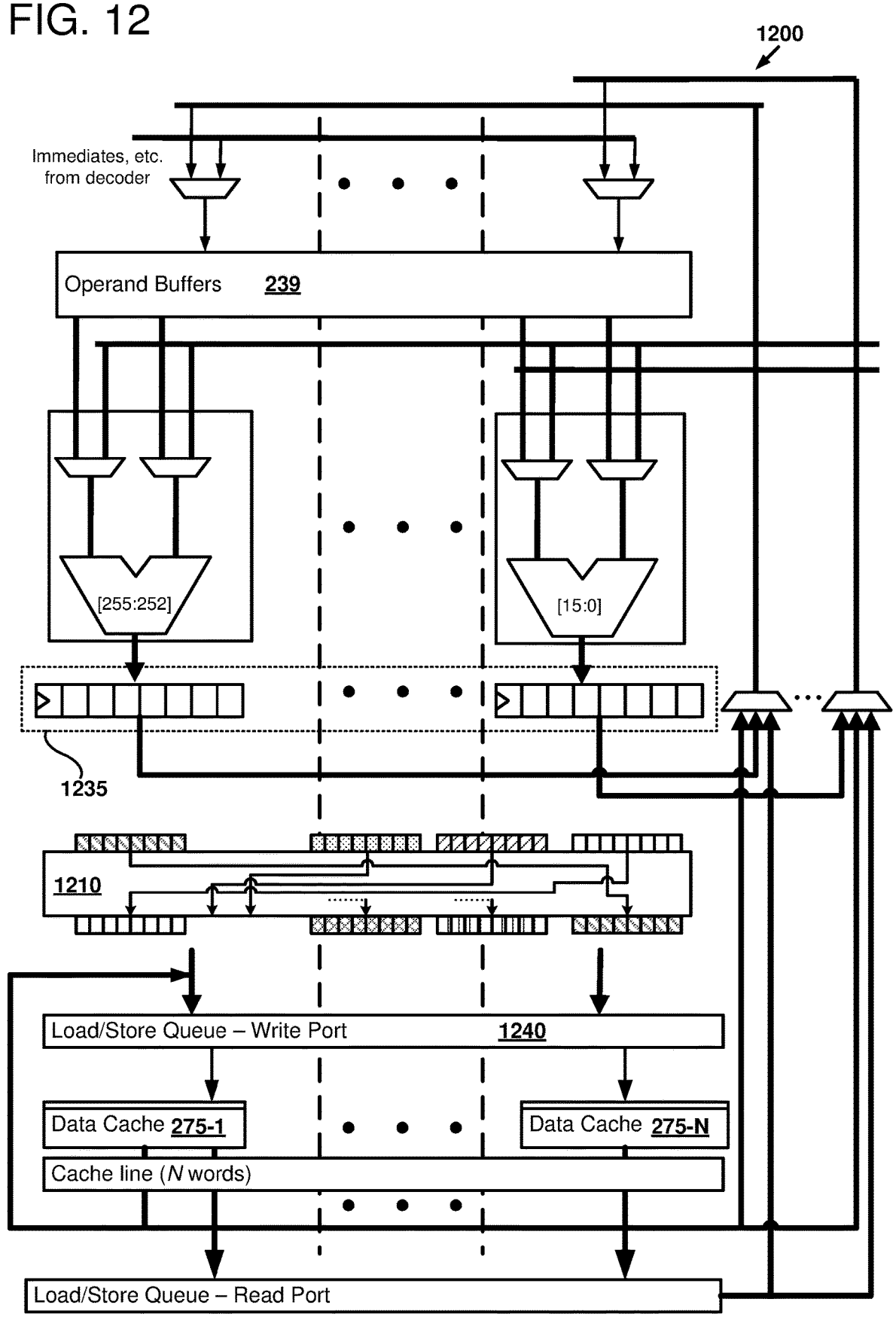
FIG. 12 is a block diagram illustrating an example data path showing alternative locations of a sharding circuit, as can be implemented in certain examples of the disclosed technology.

FIG. 12 is a block diagram 1200 outlining an example datapath for a microarchitecture in which certain examples of the disclosed technology can be implemented. As shown in FIG. 12, a sharding unit 1210 has been configured so that it is situated between execution unit output registers 1235 and the write port 1240 of a datapath. As shown, the sharding circuit 1210 is configured for a word swap operation, wherein the leftmost word leftmost input word is output as the right most output word, and the right most input word is output aft as the leftmost output word. Intermediate input words are correspondingly swapped as shown. Thus, in the illustrated example, sharding operations can be performed at different positions within the datapath, for example, the sharding can be applied before the data is output to the LSQ write port 1240.

XV. Example Method of Concurrent Cache Loading

Figure 13:
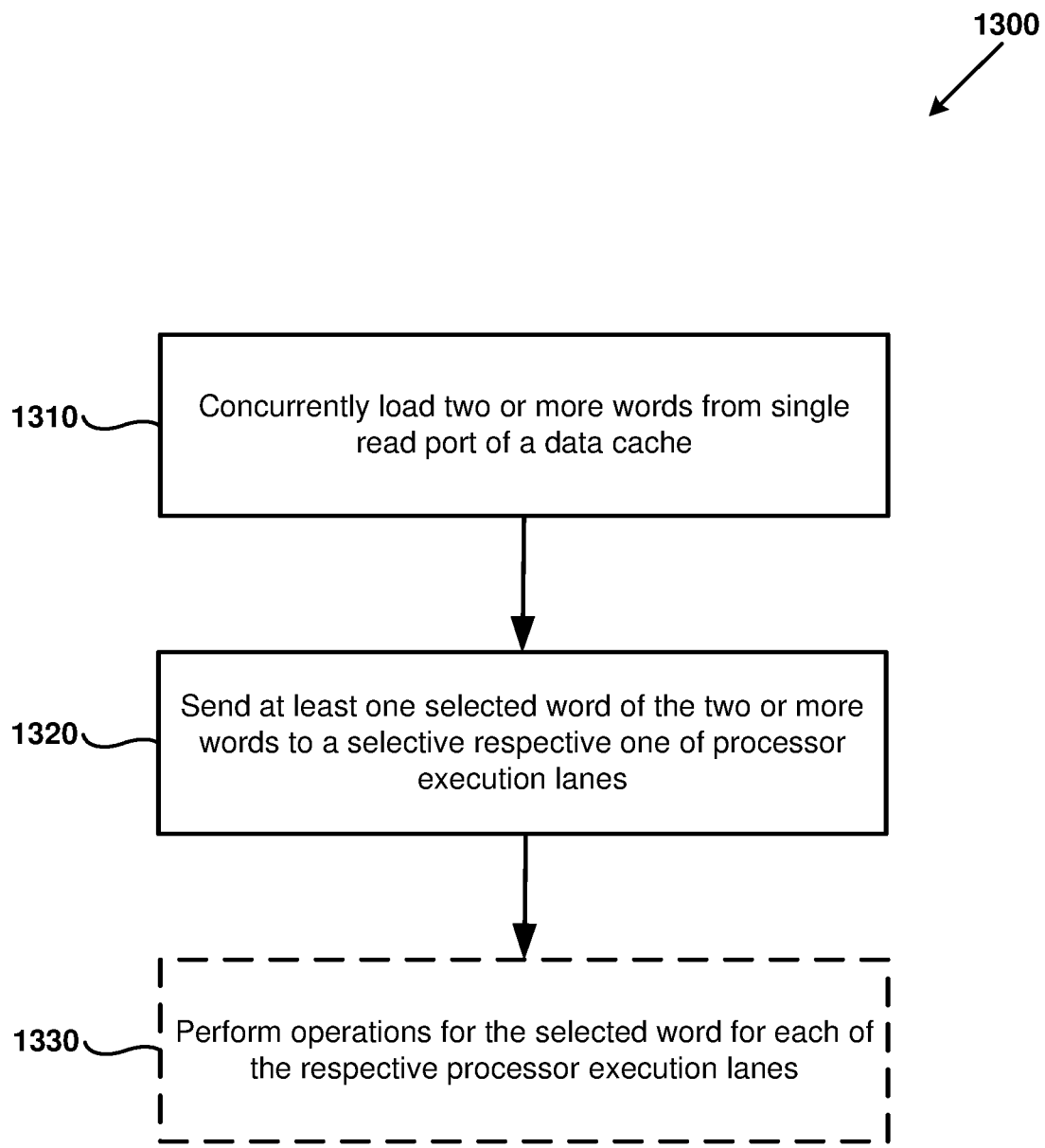
FIG. 13 is a flow chart outlining an example method of sending data from a wide cache line, as can be performed in certain examples of the disclosed technology.

FIG. 13 is a flow chart 1300 outlining an example method of loading multiple words from data cache, as can be performed in certain examples of the disclosed technology. For example, a general purpose or block-based processor including a data path such as those discussed above regarding FIGS. 7 through 12 can be used to implement the illustrated method.

Process block 1310, two or more words are loaded concurrently from a single report of a data cache. The complete collection of the plurality of words can also be referred to as a cache line. In some examples, each of the words of the cache line includes bytes that are adjacently located in memory. In other examples, the bytes may be spaced at regular intervals or arrange a memory in a different manner. The loading can be performed using a wide memory load circuit.

At process block 1320, at least one word of the concurrently loaded words is selected and sent to a respective selected lane of one of the processors execution lanes. For example, the words can be sent to the execution lanes in the same order in which they have been loaded from the data cache. In other examples, the ordering of the words can be reversed, swizzled, replicated, or otherwise rearranged. In some examples, a sharding circuit is used to rearrange the words. In some examples, a selected individual word of the plurality words is sent to a respective selective one of the execution lanes of a processor. In some examples, the selected word is sent to an operand buffer. In some examples, the selected word bypasses the processor operand buffer and is sent directly to execution resources of the selected execution lane.

At process block 1330, operations are performed for the selected word for each of the respective processor execution lanes. In some examples, performing operations includes performing SIMD operations for two or more separate portions of the selected word. In some examples, the received word is received via a writeback path circuit and the received word is multiplied by an output word of the operand, thereby producing a product. In some examples, performing operations further includes concurrently loading a second cache line of two or more words from a report of a data cache and adding a second selected word of the second cache line to a product.

In some examples, the method includes using a sharding circuit to reorder and send the respective word from the writeback path to a different one of selected execution lanes. Some examples, the sharding circuit reorders respective words by performing at least one of the following operations: shift, rotate, reverse, move, swap, transpose, extract, or extend. In some examples, a SIMD operation is performed separately for each of two or more portions of the respective word. In some examples, a compiler is used to identify at least one vector operation in code for at least one instruction block and to emit object code for the at least one instruction block that, when the object code is executed by a processor, causes the processor to perform the illustrated method.

XVI. Example Method of Concurrent Cache Loading

Figure 14:
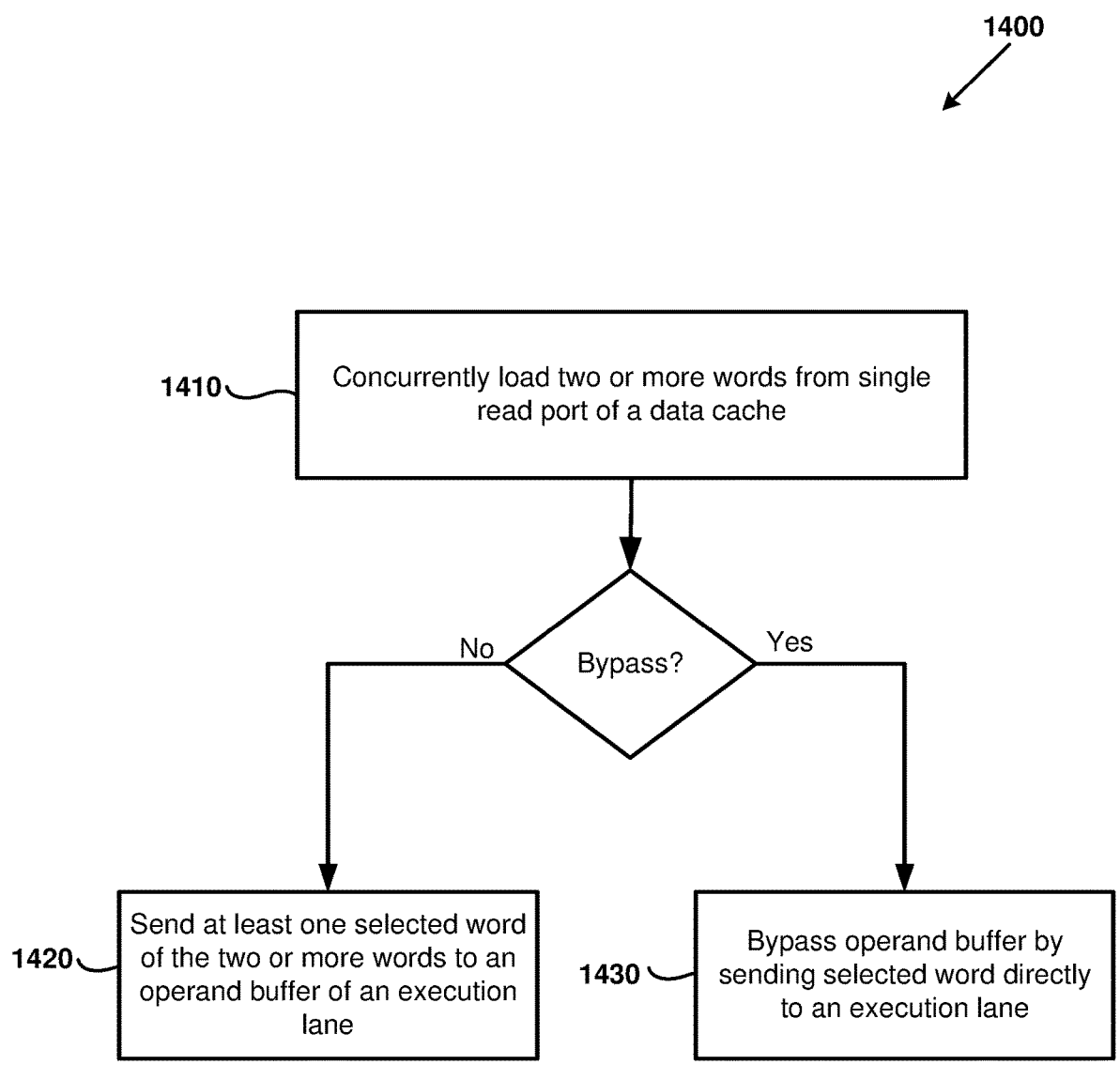
FIG. 14 is a flow chart outlining an example method of sending data from a cache line to an operand buffer, or bypassing the operand buffer, as can be performed in certain examples of the disclosed technology.

FIG. 14 is a flow chart 1400 outlining an example method of concurrently loading words from a wide data cache line and sending the loaded words to an operand buffer or bypassing the operand buffer, as can be performed in certain examples of the disclosed technology.

At process block 1410, two words are concurrently loaded from a single output of a data cache line. For example, wide memory load circuits such as those discussed above can be used to implement the cache line read. Processor control logic makes a determination whether or not to send the loaded words to the date a path operand buffer or to bypass the operand buffer and send the selected words directly to an execution lane. In some examples, the determination is based on control bits encoded in a processor instruction. In other examples, control logic is used to analyze dependencies between plural instructions and determine whether bypass operation can be safely performed. If it is determined that the words are to be sent to the operand buffer, the method proceeds to process block 1420. Conversely, if it is determined that the operand buffer is to be bypassed, the method proceeds to process block 1430.

At process block 1420, the selected word(s) are sent to an operand buffer of its respective execution lane. For example, a writeback path situated at the output of a wide memory load circuit can be used to send the words to the appropriate input of the operand buffer. The data can be stored in the operand buffer until a consuming instruction is ready to issue, and then the data can be sent to the appropriate execution units in the processor data path.

At process block 1430, the selected word bypasses the processor operand buffers and is sent directly to the selected execution lane of the processor data path. In some examples, the bypassed data is combined with other data output by the operand buffer and combined in operations performed by the execution units. For example, previously multiplied operands stored in the operand buffer can be combined with data read from the data cache that has bypassed the operand buffer producing a result of the output of the execution units.

In some examples, words of the cache line or of the execution lanes can be reordered or rearranged using a sharding circuit. For example, a sharding circuit can be used to perform word-wise or bitwise reordering of data after it is loaded from the cache line at process block 1410. In some examples, a sharding circuit is located along the bypassed path, or at the output of the execution units and reordering operations performed before storing the output data in the data cache memory. The sharding circuit can be configured according to control bits encoded within individual instructions, in an instruction block instruction header, or by determining dependencies or optimization's between instructions. In some examples, a compiler is used to identify at least one vector operation in code for at least one instruction block and to emit object code for the at least one instruction block that, when the object code is executed by a processor, causes the processor to perform the illustrated method.

XVII. Example Method of Concurrent Cache Loading

Figure 15:
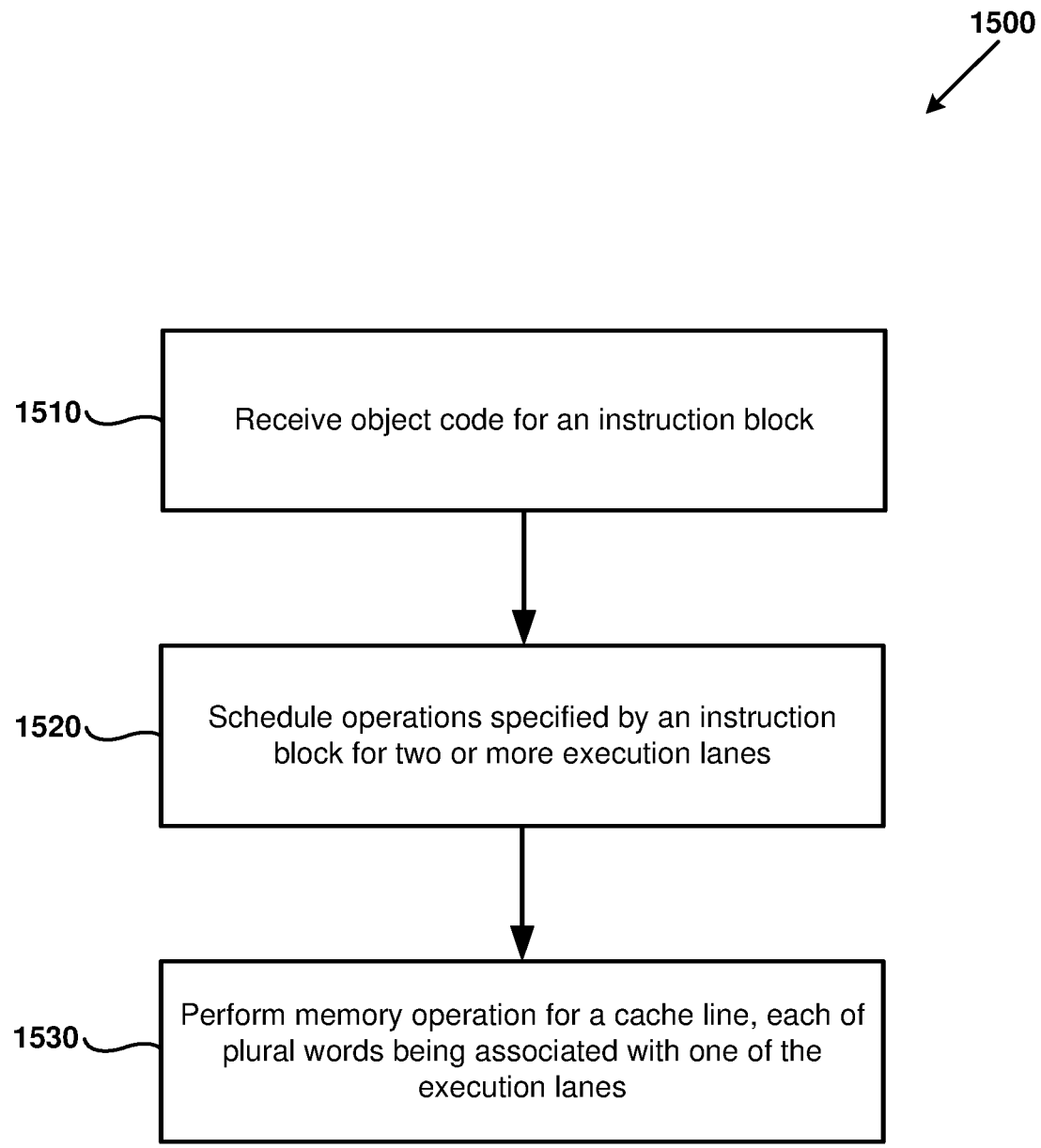
FIG. 15 is a flow chart outlining an example method of scheduling operations for two or more execution lanes and performing memory operations, as can be performed in certain examples of the disclosed technology.

FIG. 15 is a flow chart 1500 outlining an example method of scheduling operations specified by an instruction block as can be performed in certain examples of the disclosed technology. For example, any of the datapaths discussed above can be used to implement the illustrated method.

At process block 1510, object code is received for an instruction block. For example, pre-compiled instructions can be stored in memory or a storage device and retrieved and sent to the processor control logic. In other examples, an interpreter or just-in-time compiler is used to emit the received object code.

At process block 1520, operations are scheduled that have been specified by an instruction block for two or more instruction lanes. For example, based on the arrangement of instructions in memory, instruction identifiers, dependencies between instructions, LSID, or other methods of specifying operations are scheduled. For example, to calculate an inner product, multiply operations are scheduled to perform before add operations. If the number of execution units is less than the number of instruction windows, operations performed may be scheduled back to back on, for example half of the branch to be performed.

At process block 1530, memory operations are performed for at least one word read from the cache line. Each of the plural words of the cache line is associated with one of the execution lanes.

In some examples, the memory operation is a load operation and performing the memory operation includes sending each of respective plural words to a different execution lane of the processor. Some examples, the memory operation as a store operation and the performing the memory operation includes sending each of the respective plural words from its associated execution lane to a selected word of the same cache line of the data cache for writing to memory coupled to the processor. In some examples, performing the memory operation includes performing a sharding operation for the plural words after loading the words or before storing the words in the data cache. In some examples, a compiler is used to identify at least one vector operation in code for at least one instruction block and to emit object code for the at least one instruction block that, when the object code is executed by a processor, causes the processor to perform the illustrated method.

XVIII. Example Code and Scheduling for a Matrix-Vector Multiplication Loop

FIGS. 16A and 16B are source code 1600 and assembly code 1620 for performing a matrix-vector multiplication entered looped with a block-based processor, as can be implemented using data paths having disclosed memory load circuits and writeback paths, according to certain examples of the disclosed technology. As shown, an inner loop includes multiplying elements of a first matrix A with elements of a second matrix B. The products resulting from the multiplication are reduced by adding to the vector C. The associated assembly code 1620 for implementing the multiplication inner loop includes a multiply (MUL) and an addition (ADD) instruction. If these multiply and add instructions are mapped to plural execution lanes, a bottleneck may form because of the number of memory load operations (LD) the need to be performed. Thus, these operations may be sped up by allowing for a wide memory load circuit to concurrently load to or more operand words from a cache line of the associated data cache.

FIGS. 17A-B are source code 1700 and assembly code 1720 for performing a matrix-vector multiplication similar to that illustrated above regarding FIGS. 16A and 16B. However, the source code has been re-factored as illustrated such that the reduced operation is performed for every eight sets of elements of the matrix factors. This re-factoring allows for calculation of intermediate reduced values while performing the matrix multiply. This can be mapped onto data paths according to this disclosed technology, thereby increasing throughput of the processor.

FIG. 17C is source code 1740 for performing a matrix-vector multiplication similar to that illustrated above regarding FIGS. 16A and 16B. However, the multiple and reduce instructions have been replaced with SIMD instructions using 16-bit wide packed operands, as indicated 1760. Use of the packed operands can allow for more operations to occur per clock cycle, trading off number of bits of precision for additional parallel operations.

FIG. 18A is a table 1800 illustrating an example schedule of a matrix multiply on a processor having four execution lanes. The example processor can only read one word from the data cache at a time, thus, the load instructions must be staggered across different clock cycles for the four execution lanes. Thus, as shown, the load, multiply, reduce, and store operations are staggered in time for the four blocks, as indicated by the dashed lines 1810. For example, instruction lane 1 performs its memory load instructions during clock cycles numbers 10 and 11. The memory load operations for execution lane number 4 is not performed until clock cycles numbers 16 and 17. Thus, total throughput of the processor is not optimal, as the execution units of each execution lane are stalled while the other memory load operations are performed for other execution lanes. Thus, throughput could be improved by allowing for reading of wide data cache lines concurrently.

FIG. 18B is a table 1820 illustrating an example scheduling of a matrix multiply onto a processor having for execution lanes. The example processor is configured so that it can read at least 16 words from a data cache at one time. Thus, as shown, the memory load operations for all four execution lanes is performed during clock cycles 8 and 9, as indicated by the dashed lines 1830. Thus, the associated multiply instructions can occur at clock cycle 10, and the reduced operations can occur for all execution lanes at clock cycle 11. Thus, the total number of clock cycles required to complete the illustrated task is reduced from 20 clock cycles to 12 clock cycles.

XIX. Example Computing Environment

Figure 19:
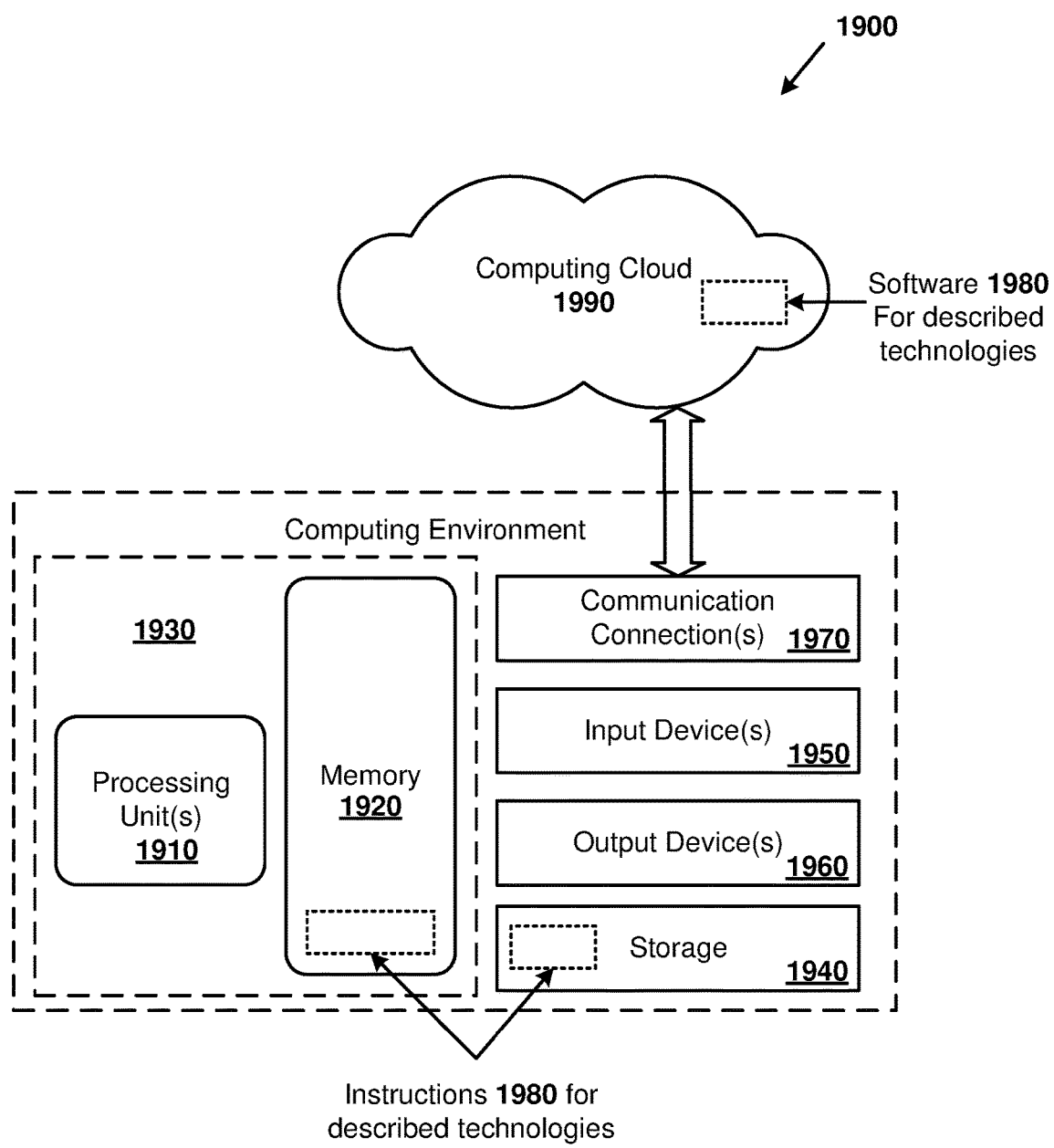
FIG. 19 is a block diagram illustrating a suitable computing environment for implementing some embodiments of the disclosed technology.

FIG. 19 illustrates a generalized example of a suitable computing environment 1900 in which described embodiments, techniques, and technologies, including sharding and writeback operations performed for wide, multi-word cache lines coupled to a general purpose or block-based processor, can be implemented.

The computing environment 1900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 19, the computing environment 1900 includes at least one processing unit 1910 and memory 1920. In FIG. 19, this most basic configuration 1930 is included within a dashed line. The processing unit 1910 executes computer-executable instructions and may be a real or a virtual processor. In a multi-processing system, multiple processing units execute computer-executable instructions to increase processing power and as such, multiple processors can be running simultaneously. The memory 1920 may be volatile memory (e.g., registers, cache, RAM), non-volatile memory (e.g., ROM, EEPROM, flash memory, etc.), or some combination of the two. The memory 1920 stores software 1980, images, and video that can, for example, be used with implementations of technologies described herein. A computing environment may have additional features. For example, the computing environment 1900 includes storage 1940, one or more input devices 1950, one or more output devices 1960, and one or more communication connections 1970. An interconnection mechanism (not shown) such as a bus, a controller, or a network, interconnects the components of the computing environment 1900. Typically, operating system software (not shown) provides an operating environment for other software executing in the computing environment 1900, and coordinates activities of the components of the computing environment 1900.

The storage 1940 may be removable or non-removable, and includes magnetic disks, magnetic tapes or cassettes, CD-ROMs, CD-RWs, DVDs, or any other medium which can be used to store information and that can be accessed within the computing environment 1900. The storage 1940 stores instructions for the software 1980, which can be used to implement technologies described herein.

The input device(s) 1950 may be a touch input device, such as a keyboard, keypad, mouse, touch screen display, pen, or trackball, a voice input device, a scanning device, or another device, that provides input to the computing environment 1900. For audio, the input device(s) 1950 may be a sound card or similar device that accepts audio input in analog or digital form, or a CD-ROM reader that provides audio samples to the computing environment 1900. The output device(s) 1960 may be a display, printer, speaker, CD-writer, or another device that provides output from the computing environment 1900.

The communication connection(s) 1970 enable communication over a communication medium (e.g., a connecting network) to another computing entity. The communication medium conveys information such as computer-executable instructions, compressed graphics information, video, or other data in a modulated data signal. The communication connection(s) 1970 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed network data operations. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1990. For example, disclosed compilers and/or block-based-processor servers are located in the computing environment 1930, or the disclosed compilers can be executed on servers located in the computing cloud 1990. In some examples, the disclosed compilers execute on traditional central processing units (e.g., RISC or CISC processors).

Computer-readable media are any available media that can be accessed within a computing environment 1900. By way of example, and not limitation, with the computing environment 1900, computer-readable media include memory 1920 and/or storage 1940. As should be readily understood, the term computer-readable storage media includes the media for data storage such as memory 1920 and storage 1940, and not transmission media such as modulated data signals.

XX. Additional Examples of the Disclosed Technology

Additional examples of the disclosed subject matter are discussed herein in accordance with the examples discussed above.

In some examples of the disclosed technology, an apparatus includes a processor having two or more execution lanes. The processor can include a data cache, which is coupled to memory, a wide memory load circuit that concurrently loads two or more words from a cache line of the data cache, and a writeback circuit situated to send a respective word of the concurrently-loaded words to a selected execution lane of the processor. The processor can execute instructions encoded in one or more different instruction sets, including CISC, RISC, block-based, DSP, or other ISA. In some examples, the memory coupled to the processor is on the same integrated circuit. In other examples, the memory is situated on a different integrated circuit and coupled to the processor using interconnect (e.g., in a multi-chip module, with an interposer, or on a printed circuit board). In some examples, the processor is an Explicit Data Graph Execution (EDGE) processor. In some examples, the processor is a neural network processor.

In some examples of the apparatus, the processor writeback circuit is further situated to send at least one respective word to an operand buffer for the selected execution lane. In some examples, the writeback circuit is further situated to send the respective word to bypass an operand buffer by sending the respective word directly to an execution unit of the selected execution lane. In some examples, the respective word bypasses the operand buffer and is not stored in an operand buffer. In some examples, the writeback circuit includes interconnect configurable to, during a particular clock cycle, select and send either words from the cache line of the data cache or words from the execution lanes to an operand buffer. In some examples, a different word of the cache line is sent to a respective each one of the execution lanes. The apparatus of claim 1, wherein the processor is an Explicit Data Graph Execution (EDGE) processor or a neural network processor.

In some examples, the apparatus further includes a sharding circuit coupled to the wide memory load circuit, the sharding circuit being configured to select individual words from the cache line and to send each of the selected words to a selected writeback channel of the processor. In some examples, the sharding circuit is configured to reorder and send a respective word from the writeback circuit to a respective one of the selected execution lanes. In some examples, the sharding circuit is configured to reorder the respective words by performing at least one of the following operations: shift, rotate, reverse, move, swap, transpose, replicate, permute, extract, or extend. In some examples, the sharding circuit can perform arithmetic or logical operations. In some examples, one or more of the input words to the sharding circuit are replicated and so one or more of the input words is not output by the sharding circuit. In some examples, two or more of the operations can be performed in combination with each other. In some examples, an operation is performed on one or more but not all words of the input to the sharding circuit, and thus only a subset of the processed input words are output.

In some examples, the respective word includes packed data and the selected execution lane is configured to perform a single instruction multiple data (SIMD) operation with the respective word, the operation being performed separately for each of two or more portions of the respective word. For example, the word can include two, three, four, six, eight, 16, 32, or other number of portions of packed operands that are operated on independently of one another.

In some examples of the disclosed technology, a method of operating a processor having a plurality of execution lanes includes concurrently loading a plurality of two or more words from a single read port of a data cache and sending a selected word of the plurality of words to a selected one of the execution lanes of the processor. The processor can execute instructions encoded in one or more different instruction sets, including CISC, RISC, block-based, DSP, or other ISA. In some examples, memory coupled to the processor is on the same integrated circuit. In other examples, the memory is situated on a different integrated circuit and coupled to the processor using interconnect (e.g., in a multi-chip module, with an interposer, or on a printed circuit board). In some examples, the processor is an Explicit Data Graph Execution (EDGE) processor. In some examples, the processor is a neural network processor.

In some examples, the method further includes sending a selected each word of the plurality of words to a respective selected one of the execution lanes of the processor. For example, each of the plurality of words can be sent to a different respective selected one of the processor execution lanes. In some examples, the selected word is sent to the selected one of the execution lanes via a writeback path, the writeback path being adapted to select and send at least an execution lane output or the selected word to the selected execution lane.

In some examples, the selected word is sent to an operand buffer. In some examples, the selected word bypasses an operand buffer and is sent directly to execution resources of the selected execution lane.

In some examples, the method further includes receiving the selected word via a writeback circuit, and, with the selected execution lane, multiplying the received word by an operand output, thereby producing a product.

In some examples of the method, the selected word is a first selected word and the plurality of words is a first plurality of words, and the method further includes concurrently loading a second plurality of two or more words from a single read port of a data cache and adding a second, selected word of the second plurality of words to the product. In some examples, the method further includes not storing the first selected word, the second selected word, or the first and second selected words in an operand buffer.

In some examples, the method further includes performing a single instruction multiple data (SIMD) operation for at least two separate portions of the selected word. In some examples, the processor is an explicit data graph execution (EDGE) processor. In some examples, the processor is neural network processor. The processor can execute instructions encoded in one or more different instruction sets, including CISC, RISC, block-based, DSP, or other ISA.

In some examples, one or more computer-readable storage media storing computer-readable instructions that when executed by a processor, cause the processor to perform any of the disclosed methods. In some examples, the processor is an explicit data graph execution (EDGE) processor. In some examples, the processor is neural network processor.

The processor can execute instructions encoded in one or more different instruction sets, including CISC, RISC, block-based, DSP, or other ISA. For example, the computer-readable storage media can cause the processor to perform a method include identifying at least one vector operation in code for at least one instruction block and emitting object code, intermediate language code, or assembly code for the at least one instruction block that, when the code is executed by a processor, causes the processor to perform any one of the disclosed methods. In some examples, the object code includes at least one instruction encoded to indicate that the plurality of words is to be loaded and sent to the selected execution lanes.

In some examples, the code is not specifically encoded to indicate that the plurality of words is to be loaded and sent to the selected execution lanes, and wherein the processor is configured to determine that the plurality of words is to be loaded and sent to the selected execution lanes.

In some examples, a method of operating a processor includes receiving object code for at least one instruction block, scheduling one or more operations specified in an instruction block to be executed by two or more execution lanes of a processor core, and executing the scheduled operations by processor. In some examples, the executing includes performing a memory operation for a cache line of a data cache, each of plural words of the cache line memory operation being associated with one of the execution lanes of the process core.

In some examples, the memory operation is a load operation, and the performing the memory operation includes sending each of respective plural words to a different execution lane of the processor. In some examples, the memory operation is a store operation, and wherein the performing the memory operation comprises sending each of respective plural words from its associated execution lane to the same cache line of the data cache for writing to memory coupled to the processor. In some examples, performing the memory operation comprises performing a sharding operation for the plural words after loading from or before storing words in the data cache. In some examples, the scheduling comprises assigning one of the execution lanes as a leader lane, and the remaining execution lanes concurrently follow the leader lane when executing the scheduled operations. In some examples, the scheduling includes performing the memory operation for all of the execution lanes concurrently, and the executing the scheduled operations is performed in a different clock cycle for at least one of the execution lanes than another one of the execution lanes.

In some examples, the scheduled operations comprise at least one or more of the following: a multiplication inner loop, a dot product operation, a cross product operation, a multiply-add operation, a matrix arithmetic operation, or a vector arithmetic operation. In some examples, the method includes evaluating a neural network by performing the scheduling and executing operations. In some examples, the executing includes not writing back values produced by the memory operation to operand buffers of the processor.

In some examples of the method, the memory operation is a first load operation and the executing the scheduled operations further includes performing a second load operation, where each of the plural words for the first load operation is stored in an operand buffer and where each of the plural words for the second load operation is not stored in the operand buffer but is immediately combined with a result calculated based on the plural words stored in the operand buffer.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims and their equivalents.

What is claimed is:

1. A method of operating a processor, the method comprising:
   receiving object code for an instruction group;
   scheduling one or more operations specified in the instruction group to be executed by two or more execution lanes of a processor core; and
   executing the scheduled operations by the processor, the executing comprising:
   performing a memory operation for a cache line of a data cache, each of plural words of the cache line memory operation being associated with one of the execution lanes of the processor core; and
   performing sharding operations for the plural words (a) after loading the words when performing the memory operation, or (b) before storing the words in the data cache when performing the memory operation.

2. The method of claim 1, wherein the memory operation is a store operation, and wherein the performing the memory operation comprises sending each of respective plural words from its associated execution lane to the same cache line of the data cache for writing to memory coupled to the processor.

3. The method of claim 1, wherein the scheduling comprises assigning one of the execution lanes as a leader lane, and wherein the remaining execution lanes concurrently follow the leader lane when executing the scheduled operations.

4. The method of claim 1, wherein the operations are scheduled based on arrangement of instructions in the instruction group, instruction identifiers encoded in the instruction group, or dependencies encoded in instructions in the instruction group.

5. The method of claim 1, further comprising scheduling a multiply operation for calculating an inner product in the instruction group prior to scheduling an add operation for calculating the inner product in the instruction group.

6. The method of claim 1, wherein the sharding operations comprise at least one of: shift, rotate, reverse, move, swap, transpose, extract, or extend.

7. The method of claim 1, wherein the scheduling is performed responsive to identifying a vector instruction in the instruction group.

8. The method of claim 1, wherein each of the execution lanes comprises a distinct at least one of: an integer arithmetic and logic unit (ALU), an adder, a subtractor, a multiplier, a divider, a shifter, a rotator, or a floating point unit (FPU).

9. The method of claim 1, wherein each of the execution lanes is configurable to execute a respective context distinct from a context of any other execution lane.

10. A method of operating a processor, the method comprising:
    receiving object code for an instruction group;
    scheduling one or more operations specified in the instruction group to be executed by two or more execution lanes of a processor core; and executing the scheduled operations by the processor, the executing comprising:
performing a first load operation for a cache line of a data cache, each of plural words of the cache line memory operation being associated with one of the execution lanes of the processor core and being stored in an operand buffer, and
performing a second load operation, each of plural words for the second load operation not being stored in the operand buffer but being immediately combined with a result calculated based on the plural words stored in the operand buffer.

11. An apparatus, comprising:
a data cache coupled to memory, the data cache having at least one cache line and providing plural output words from the cache line;
an operand buffer; and
a plurality of execution lanes of a processor core, each of the plurality of execution lanes being configured to receive a different word of the plural output words; the processor core being configured to:
store plural words for a first load operation in the operand buffer coupled to the execution lanes, and
immediately combine plural words for a second load operation with a result calculated based on the plural words stored in the operand buffer.

12. The apparatus of claim 11, wherein each of the execution lanes is configured to send a respective word to a same cache line of the data cache for writing to the memory.

13. The apparatus of claim 11, wherein one of the execution lanes is assigned to be a leader lane, and wherein at least one of the remaining execution lanes concurrently follows the leader lane when executing the scheduled operations.

14. The apparatus of claim 11, further comprising:
an operand buffer;
additional multiplexer logic configured to select either a high portion of words from the operand buffer or a low portion of words from the operand buffer; and
wherein the processor core is configured to use only one half of the execution lanes during a first clock cycle and to use only one half of the execution lanes in a second clock cycle subsequent to the first clock cycle.

15. The apparatus of claim 11, further comprising a writeback path adapted to select and send an output word from at least one execution lane to an input word of at least one other execution lane.

16. An apparatus, comprising:
a plurality of execution lanes;
means for receiving object code for at least one instruction group;
means for scheduling one or more operations specified in the at least one instruction group;
means for executing the scheduled operations by performing a memory operation for a cache line of a data cache; and
sharding means for performing word swap operations with output of the execution lanes.

17. The apparatus of claim 16, wherein the means for executing the scheduled operations associates each of plural words of the cache line memory operation with one of the execution lanes of the processor core.

18. The apparatus of claim 16, further comprising:
bypass means for bypassing an operand buffer coupled to the execution lanes and sending a word directly to a selected one of the execution lanes.

* * * * *